(12) United States Patent
Kilfoyle

(10) Patent No.: US 7,016,332 B2
(45) Date of Patent: Mar. 21, 2006

(54) METHOD AND SYSTEM FOR A REMOTE DOWNLINK TRANSMITTER FOR INCREASING THE CAPACITY OF A MULTIPLE ACCESS INTERFERENCE LIMITED SPREAD-SPECTRUM WIRELESS NETWORK

(75) Inventor: Daniel B. Kilfoyle, Falmouth, MA (US)

(73) Assignee: Science Applications International Corporation, San Diego, CA (US)

(*) Notice: Subject to any disclaimer, the term of this patent is extended or adjusted under 35 U.S.C. 154(b) by 859 days.

(21) Appl. No.: 09/773,667

(22) Filed: Feb. 2, 2001

(65) Prior Publication Data
US 2002/0093926 A1 Jul. 18, 2002

Related U.S. Application Data

(60) Provisional application No. 60/262,098, filed on Jan. 18, 2001, provisional application No. 60/251,231, filed on Dec. 5, 2000.

(51) Int. Cl.
*H04B 7/216* (2006.01)

(52) U.S. Cl. ................. 370/335; 370/315; 370/342

(58) Field of Classification Search ............ 370/315, 370/320, 328, 338, 342; 455/524, 561, 422.1
See application file for complete search history.

(56) References Cited

U.S. PATENT DOCUMENTS

| | | | | |
|---|---|---|---|---|
| 3,916,311 A | * | 10/1975 | Martin et al. ............. | 455/14 |
| 4,901,307 A | | 2/1990 | Gilhousen et al. .......... | 370/18 |
| 5,152,002 A | | 9/1992 | Leslie et al. ............. | 455/11.1 |
| 5,187,806 A | | 2/1993 | Johnson et al. ........... | 455/15 |
| 5,440,642 A | | 8/1995 | Denenberg et al. ........ | 381/71 |
| 5,652,765 A | | 7/1997 | Adachi et al. ............ | 375/211 |
| 5,684,491 A | | 11/1997 | Newman et al. ........... | 342/374 |
| 5,765,099 A | | 6/1998 | Georges et al. ........... | 455/14 |
| 5,809,398 A | | 9/1998 | Moberg et al. ........... | 455/17 |
| 5,809,422 A | | 9/1998 | Raleigh et al. ........... | 455/449 |
| 5,812,933 A | | 9/1998 | Niki ...................... | 455/16 |
| 5,835,848 A | | 11/1998 | Bi et al. ................. | 455/24 |
| 5,867,485 A | | 2/1999 | Chambers et al. ......... | 370/281 |
| 5,875,209 A | | 2/1999 | Ogata ..................... | 375/211 |
| 5,887,261 A | | 3/1999 | Csapo et al. ............. | 455/450 |
| 5,923,325 A | | 7/1999 | Barber et al. ........... | 345/336 |
| 5,930,293 A | | 7/1999 | Light et al. ............. | 375/211 |
| 5,936,754 A | | 8/1999 | Ariyavisitakul et al. ... | 359/145 |

(Continued)

FOREIGN PATENT DOCUMENTS

WO    WO 97/42720    11/1997

OTHER PUBLICATIONS

International Search Report for Application No. PCT/US03/21691, dated Oct. 3, 2003 (mailing date).

(Continued)

*Primary Examiner*—Ricky Ngo
*Assistant Examiner*—Christine Ng
(74) *Attorney, Agent, or Firm*—Kilpatrick Stockton LLP

(57) ABSTRACT

The present invention relates to a system and method for extending the coverage area and communication capacity of a spread-spectrum based wireless network. The system comprises a unique dual-scale, asymmetrical cellular architecture for a wireless network, wherein the communication uplink is based on a macro-cellular system, and the communication downlink is based on a micro-cellular system. Through the user of remote downlink transmitters in the micro-cellular system, the present invention provides a cost effective solution for increasing communication capacity and extending coverage area.

18 Claims, 25 Drawing Sheets

U.S. PATENT DOCUMENTS

| | | | | |
|---|---|---|---|---|
| 5,953,325 | A | 9/1999 | Willars | 370/335 |
| 5,956,333 | A | 9/1999 | Zhou et al. | 370/342 |
| 5,970,410 | A | 10/1999 | Carney et al. | 455/446 |
| 5,991,345 | A | 11/1999 | Ramasastry | 375/347 |
| 6,005,884 | A * | 12/1999 | Cook et al. | 375/132 |
| 6,014,373 | A | 1/2000 | Schilling et al. | 370/342 |
| 6,035,218 | A | 3/2000 | Oh et al. | 455/562 |
| 6,052,558 | A | 4/2000 | Cook et al. | 455/12.1 |
| 6,078,823 | A | 6/2000 | Chavez et al. | 455/562 |
| 6,081,516 | A | 6/2000 | Yoshida et al. | 370/342 |
| 6,085,075 | A | 7/2000 | Van Bezooijen | 455/260 |
| 6,097,928 | A | 8/2000 | Jeon | 455/8 |
| 6,101,399 | A | 8/2000 | Raleigh et al. | 455/561 |
| 6,104,933 | A | 8/2000 | Frodigh et al. | 455/522 |
| 6,108,364 | A | 8/2000 | Weaver, Jr. et al. | 375/130 |
| 6,118,983 | A | 9/2000 | Egusa et al. | 455/69 |
| 6,119,010 | A | 9/2000 | Labedz | 455/446 |
| 6,137,784 | A * | 10/2000 | Wallerius et al. | 370/328 |
| 6,141,533 | A | 10/2000 | Wilson et al. | 455/11.1 |
| 6,310,856 | B1 * | 10/2001 | Taipale | 370/208 |
| 6,353,729 | B1 * | 3/2002 | Bassirat | 455/11.1 |
| 6,370,185 | B1 | 4/2002 | Schmutz et al. | 375/214 |
| 6,400,959 | B1 * | 6/2002 | Nagira et al. | 455/503 |
| 6,483,355 | B1 | 11/2002 | Lee et al. | 327/113 |
| 6,549,545 | B1 | 4/2003 | Yamamoto et al. | 370/508 |
| 6,584,080 | B1 * | 6/2003 | Ganz et al. | 370/315 |
| 6,625,198 | B1 * | 9/2003 | Tiedemann et al. | 375/130 |
| 6,711,142 | B1 * | 3/2004 | Suzuki et al. | 370/329 |
| 2002/0041248 | A1 | 4/2002 | Galton | 341/156 |
| 2002/0067761 | A1 | 6/2002 | Kong et al. | 375/148 |
| 2002/0115448 | A1 * | 8/2002 | Amerga et al. | 455/456 |
| 2002/0155838 | A1 * | 10/2002 | Durrant et al. | 455/445 |
| 2002/0160804 | A1 | 10/2002 | Bogner et al. | 455/522 |

OTHER PUBLICATIONS

Preliminary Examination Report for Application No. PCT/US01/45663, dated Jul. 23, 2003 (mailing date).

Lee, William C. Y., et al., "The Impact of Repeaters on CDMA System Performance," Vodafone AirTouch Global Technology, *IEEE*, pp. 1763-1767, 2000.

"3G TR 25.922 V. 3.1.0 (Mar. 2000)—3$^{rd}$ Generation Partnership Project; Technical Specification Group Radio Access Network; Radio Resource Management Strategies (Release 1999)," 59 pp., Copyright 2000.

"3G TS 25.331 V. 3.5.0 (Dec. 2000)—3$^{rd}$ Generation Partnership Project; Technical Specification Group Radio Access Network; RRC Protocol Specification (Release 1999)," 158 pp., Copyright 2000.

Written Opinion for Application No. PCT/US01/45663, dated Nov. 18, 2002 (mailing date).

Written Opinion for Application No. PCT/US03/21691, dated Sep. 7, 2004 (mailing date).

Preliminary Examination Report for Application No. PCT/US03/21691, dated Jan. 10, 2005 (mailing date).

* cited by examiner

Subscriber Assignment Pattern
for a typical cell simulation (a) Rate 1/2 convolutional coder (b) Rate 1/3 convolutional coder

METHOD AND SYSTEM FOR A REMOTE DOWNLINK TRANSMITTER FOR INCREASING THE CAPACITY OF A MULTIPLE ACCESS INTERFERENCE LIMITED SPREAD-SPECTRUM WIRELESS NETWORK

This application claims the benefits of U.S. Provisional Application Nos. 60/262,098 and 60/251,231 both titled "REMOTE DOWNLINK TRANSMITTER FOR INCREASING THE CAPACITY OF A MULTIPLE ACCESS INTERFERENCE LIMITED WCDMA CELLULAR NETWORK," filed Jan. 18, 2001 and Dec. 5, 2000, respectively, which are herein incorporated by reference in its entirety.

BACKGROUND OF THE INVENTION

1. Field of the Invention

The present invention relates generally to wireless networks and communication. Specifically, the preferred embodiments of the present invention relate to methods and systems for providing remote antennas to extend the coverage area and call capacity of a spread-spectrum based wireless network.

2. Description of the Related Art

The field of spread spectrum, wireless communication has been active for over a decade. For instance, the advantages of an exemplary code division multiple access (CDMA) system are described in U.S. Pat. No. 4,901,307 issued Feb. 13, 1990 to K. Gilhousen et al. Since then, a number of techniques have been proposed for compensating the multiple access interference (MAI) associated with spread spectrum wireless systems. As conventionally known in the art, MAI is a significant noise source limiting the practical capacity and performance of second generation, spread-spectrum based wireless services, such as one based on CDMA digital transmission.

The foremost technique for compensating MAI and ensuring reliable communication is to control the transmitted power from both the mobile station and the base station. Several examples of this technique are described in U.S. Pat. Nos. 6,119,010, 6,118,983, and 6,104,933. A second technique relies on controlling the patterns of the receiving and transmitting antennas. By dividing the service area into independent sectors or adaptively nulling interferers (so-called space time adaptive processing), MAI from other users that are directionally resolvable may be substantially reduced. U.S. Pat. Nos. 6,101,399, 6,078,823, and 5,953,325 are examples of this technique. Yet another technique utilizes complex, non-linear algorithms in the receiver to concurrently estimate the signals from a multitude of users, as shown in U.S. Pat. Nos. 6,081,516, 6,014,373, and 5,956,333). Termed multi-user detection (MUD), such approaches require extensive computational resources at the receiver and, as such, are suitable for use on the uplink (at the base station) but not on the downlink (at the mobile).

The use of signal repeaters also has been proposed in the field of spread spectrum, wireless communication. As conventionally known in the art, repeaters are basically devices that amplify or regenerate the data signal in order to extend the transmission distance. The industry standard organization for next generation, i.e. third generation (3G), CDMA systems has included one implementation of repeaters in its standard. Termed Opportunity Driven Multiple Access (ODMA), that configuration is discussed in the Third Generation Partnership Project Technical Report 25.924 version 1.0.0. A number of patents, such as U.S. Pat. Nos. 6,108,364 and 5,875,209, also relate to repeaters. Additionally, there are patents, such as U.S. Pat. Nos. 5,936,754, 5,867,485, and 5,809,422, that propose remote emitters linked to the base station via means other than an in-band radio frequency (RF) transmission to support both the uplink and downlink.

BRIEF SUMMARY OF THE INVENTION

The offering of high data rate services, as is envisioned for third generation (3G) wireless services, accentuates the aforementioned problems of multiple access interference (MAI) noise as the higher data rates are achieved at the expense of processing gain. This in turn requires the data users of spread spectrum, wireless networks to operate at higher power levels. In a wide-band code division multiple access (W-CDMA) wireless network, for example, the level of MAI is an important determinant of achievable network capacity; wherein capacity is herein defined to be the maximum data throughput in a network with an acceptable error rate for a given modulation and demodulation architecture.

The potentially large computational capabilities of the base station allow sophisticated signal processing algorithms to be employed to increase capacity in the reception of mobile-to-base station signals (uplink or reverse link) and mitigation of MAI in a spread-spectrum, wireless network. However, the base station to mobile link (downlink or forward link) is limited by the mobile hardware such as the mobile cellular telephone, which is typically quite unsophisticated. Thus, the absence of such large computational capabilities at the mobile subscriber introduces a network imbalance that precludes optimizing system performance and balancing system capacity. Conventional repeaters and remote emitters of the types mentioned earlier have been used to address this network imbalance in MAI mitigation. However, the essential feature of the aforementioned conventional repeaters is that information is conveyed to the remote site using the same frequency band as the underlying spread spectrum system. Due to this constraint, the repeaters extend the range of the network but do not allow an increase in practical capacity of each network cell, which is conventionally known in the art as the basic geographic unit of the cellular architecture often employed in wireless networks. Likewise, the aforementioned conventional remote emitters must support both communication downlink (forward link) and uplink (reverse link) in order to only extend the coverage area; wherein support of the reverse link involves substantially more complexity and cost than support of the forward link. Thus, there exists a need to economically increase the call capacity and coverage area of spread spectrum, wireless networks.

Accordingly, the preferred embodiments of the present invention provide a method and system for implementing remote antennas in a spread-spectrum based wireless network to optimize system performance and extend both the network's coverage area and call capacity.

The preferred embodiments of the present invention also provide a low-cost, dual-scale architecture for a spread-spectrum based wireless network, wherein communication uplink from the user to the network's base station is based on a macro-cellular system, and communication downlink from the base station to the user is based on a micro-cellular system overlaying the macro-cellular system and having at least one remote downlink transmitter (RDT).

The preferred embodiments of the present invention also provide a low-cost, optimal method and system for a spread-spectrum based wireless network that comprises at least a base station and a remote emitter, wherein portions of the a physical layer processing capability of the base station is relocated out to the remote emitter to reduce the data rate link requirements between the base station and the remote emitter and lower the overall network cost.

The preferred embodiments of the present invention further provide a cost-effective method and system for an optimum-performance, spread-spectrum based wireless network, wherein support and performance enhancements are restricted to the forward link to achieve lower network cost than what would be required for both downlink and uplink support.

The preferred embodiments of the present invention additionally provide a method and system for embedding at least one RDT in an existing macro-cell of a spread-spectrum based, wireless network to increase not only the coverage area but also the maximum data throughput supported by that cell.

The preferred embodiments of the present invention further provide a method and system for implementing a forward link manager (FLM) in a spread spectrum based wireless network to dynamically and independently control the assignment of user equipment uplink and downlink access to newly available radio sources, including RDTs, and improve the practical network capacity by enabling the use of RDTs and matching the assigned load to available radio resources.

Additional aspects and novel features of the invention will be set forth in part in the description that follows, and in part will become more apparent to those skilled in the art upon examination of the disclosure.

BRIEF DESCRIPTION OF THE DRAWINGS

The preferred embodiments are illustrated by way of example and not limited in the following figures, in which.

DETAILED DESCRIPTION OF THE INVENTION

Through analysis and simulations disclosed herein, it will be shown that the practical capacity of a spread-spectrum based wireless network, such as a wide-band code division multiple access (W-CDMA) network, with nominal system parameters, is nearly a constant per cell rather than a constant per coverage area. More specifically stated, the maximum combined data throughput is set by the combined effect of transmission power limits and individual user signal to interference plus noise ratio (SINR) limits and is, in fact, insensitive to the size of the cell for cell sizes typical of urban implementations (cell radius between 0.5 km and 3.0 km). Thus, according to an embodiment of the present invention, it is determined that a micro-cellular architecture over the same area as a macro-cellular architecture will lead to a higher practical capacity for the network. Furthermore, the improvements may be independently awarded to the uplink or reverse link (the reception of mobile-to-basestation signals) and downlink or forward link (the reception of base-station-to-mobile signals). This is verified via simulations using, for example, W-CDMA network modeling tools for a simplistic one-dimensional, one-cell model as well as a high-fidelity two-dimensional multi-cellular network model.

Figure 1:
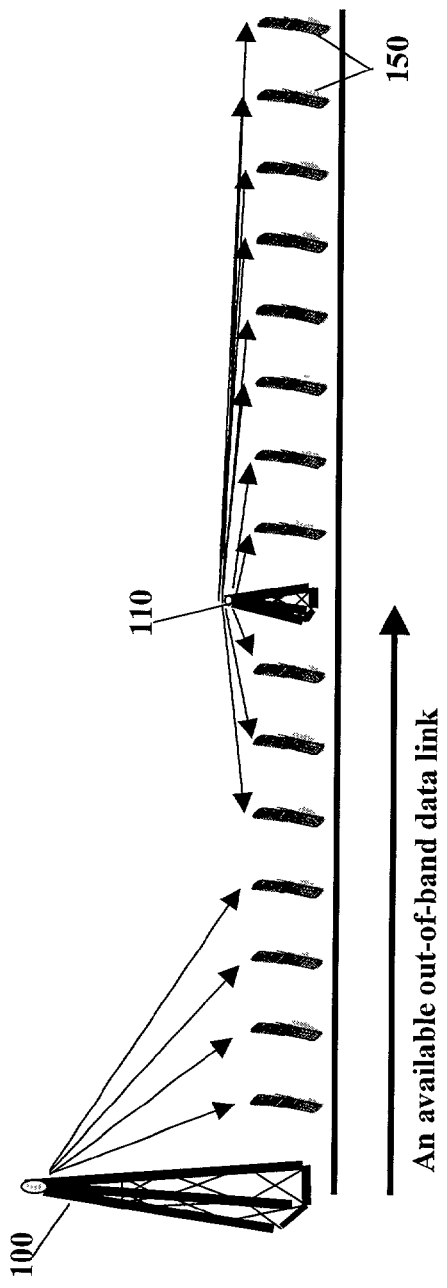
FIG. 1 shows a schematic depiction of a one-dimensional, one-cell wide-band code division multiple access (W-CDMA) model for simulation with a remote-downlink-transmitter (RDT) implementation, wherein the base station to RDT data link is out of band over a network of opportunity.
Figure 2:
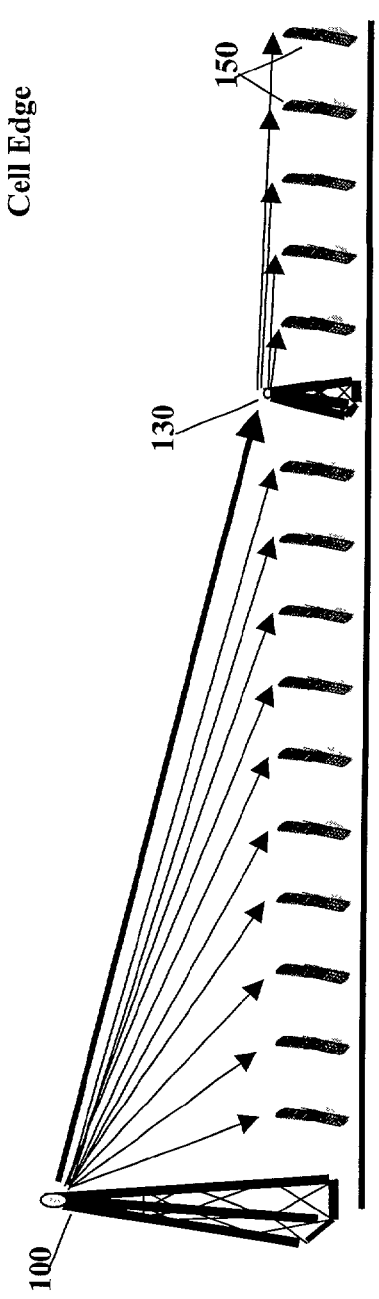
FIG. 2 shows a schematic depiction of a one-dimensional, one-cell W-CDMA model for simulation with an opportunity-driven-multiple-access (ODMA) implementation, wherein the data link is carried over the downlink.

FIGS. 1 and 2 illustrate a one-dimensional, one-cell W-CDMA model for simulation with a remote-downlink-transmitter (RDT), in accordance to an embodiment of the present invention, and a conventional opportunity-drive-multiple-access (ODMA) terminal, respectively; wherein the base station to RDT data link is out of band over a network of opportunity. The models of FIGS. 1 and 2 begin with a single base station (BS) 100 placed at the origin of a one-dimensional coordinate system. User equipments (UEs) 150 demanding a single quality of service (e.g., 8 kbits/sec voice service) are uniformly distributed out to the cell edge along a line away from the BS 100. The UEs may include cellular telephones or any other devices that desire and/or are capable of wireless communication. At the mid-point of the cell along the line, a remote emitter is placed. It is assumed for simulation purposes that the remote emitter supports at least the physical layer processing of the downlink but may include all aspects of downlink processing, i.e. it can become another BS. As is known to one skilled in the art, the physical layer is one of the layers in the standard open system interconnect (OSI) reference model for a communication architecture. It includes the actual electrical or mechanical interface to the physical medium for communication.

Two systems are modeled and simulated. In the first system, which is shown in FIG. 1, the remote emitter includes a RDT 110 with one sector facing back toward the BS 100 and the other sector facing outward away from the BS 100. Users with UEs 150 are assigned to the BS 100 or the RDT 110 based on which is closer. User data is assumed to be available at the RDT 110. Parameters for processing gain, noise figure, target SINR, and power limitations are taken from the 3GPP Simulation specification, Technical Report (TR) 25.942 Version 2.2.1, which is available on-line at http://www.3gpp.org and herein incorporated by reference in its entirety. In the second system, which is shown in FIG. 2, the remote emitter includes an ODMA remote terminal or repeater 130. User data is assumed to be carried on the downlink from the BS 100 to the ODMA repeater 130, where it is received and retransmitted. In the case of an ODMA implementation, it is only sensible for users with UEs 150 beyond the ODMA remote terminal 130 to be assigned to the ODMA remote terminal 130, as shown in FIG. 2.

Figure 3:
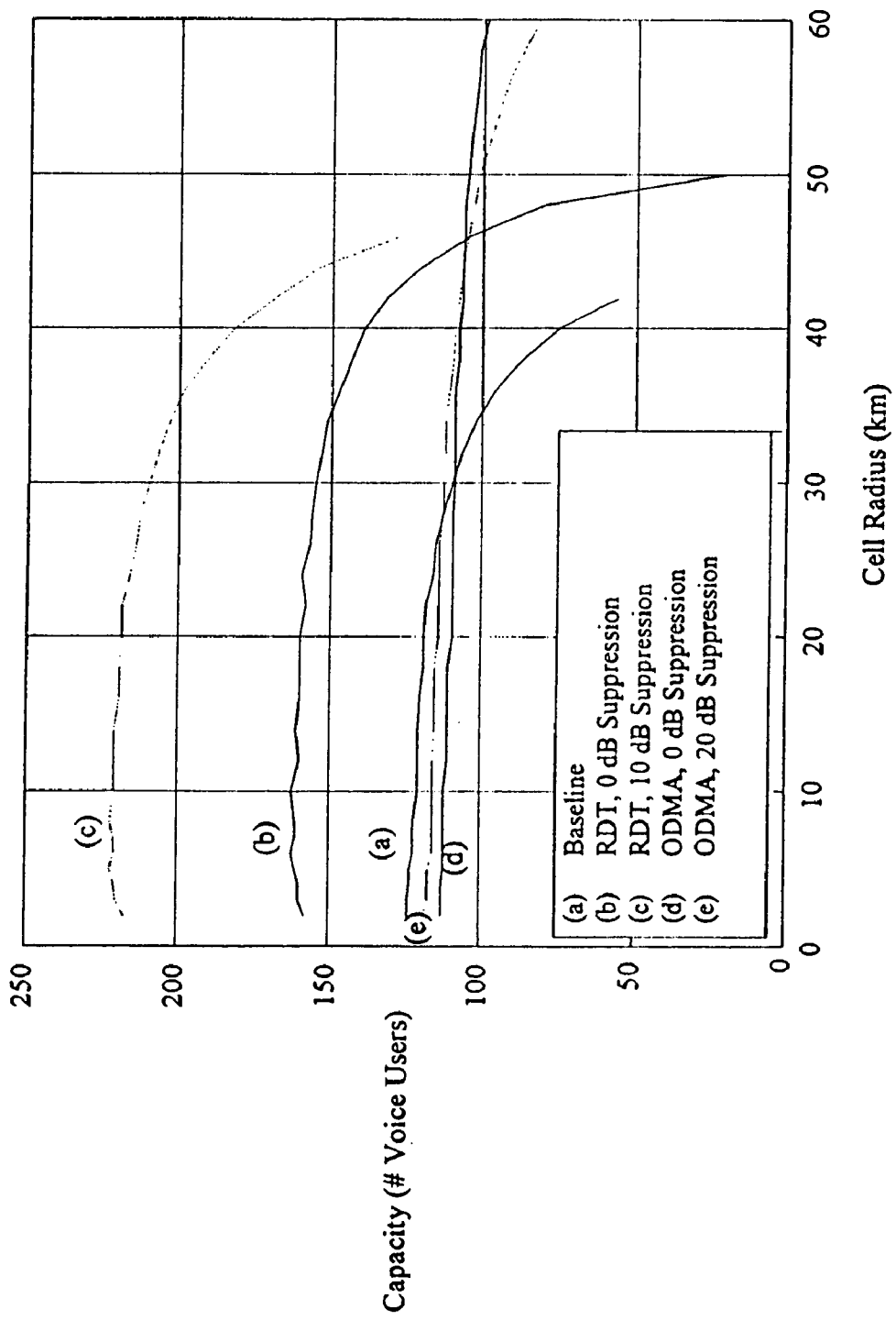
FIG. 3 shows simulations of cell capacity as a function of cell width for several system configurations for models shown in FIGS. 1 and 2.

FIG. 3 shows the results of a simulation of cell capacity as a function of cell width for the one-dimensional, one-cell models shown in FIGS. 1 and 2, assuming a uniform distribution of users along the cell. FIG. 3 shows the simulation results for the following five system configurations: (a) a baseline system, i.e., one with a base station and no remote emitters; (b) a single RDT at the cell midpoint with no back lobe suppression; (c) a single RDT at the cell midpoint with 10 dB back lobe suppression; (d) a single ODMA at 0.75 of the cell size with no back lobe suppression; and (e) a single ODMA at 0.75 of the cell size with 20 dB back lobe suppression.

In the simulation, the remote emitter, whether it includes the RDT 110 or the ODMA repeaters 130, is assumed to be at a disadvantaged height of 20 meters (m) and the BS 100 at 50 m. An important feature is that below a certain cell size, practical capacity of any given configuration is independent of cell size. Thus, for cell size such that MAI dominates, only the RDTs can increase capacity. As shown in FIG. 3, an addition of an RDT without any back lobe suppression to a baseline system increases the capacity by about 30%, as shown from the comparison of line (b) and line (a); whereas, the increase is 100% for the addition of an RDT with 10 dB back lobe suppression to the baseline system, as shown from the comparison of line (c) to line (a). Indeed, ODMA systems actually decrease capacity without adequate back lobe suppression, as line (d) in FIG. 3 shows, because they increase the interference levels for users between the base station and the repeater. With adequate ODMA back lobe suppression, as shown by line (e) in FIG. 3, coverage is extended to near baseline level with a minimal impact on capacity. In summary, ODMA repeaters, such as the ODMA remoter terminal 130 shown in FIG. 2, can only extend coverage at constant capacity; whereas, the selective use of RDTs, such as the RDT 110 shown in FIG. 1, can both extend coverage and increase capacity.

Similar conclusions can also be reached through mathematical analysis. To first order, the performance of a WCDMA downlink is described by the constraint that the signal to interference plus noise ratio (SINR) reaches a target value. Specifically, $$\frac{P_i L_i^{-1} G}{\sum_{\substack{j=1 \\ j \neq i}}^{N} P_j L_i^{-1} + N_0} = SINR_{target} \qquad \text{Eq. (1)}$$

In Eq. (1), $P_i$ is the transmitted power of the $i^{th}$ user, $L_i$ is the path loss to the user's receiver as given by a Hata model, $N_0$ is the receiver noise power, G is the processing gain, and $SINR_{target}$ is the desired SINR at the receiver. To simplify the mathematics without sacrificing accuracy, many effects such as log-normal shadowing, control channel traffic, and antenna patterns are neglected here in order to focus on the fundamental behavior of the system. If there are N users, there are N such equations. If the system is dominated by MAI and, therefore, heavily loaded, an approximate analytical solution is obtainable. Assume that $P_i$ is of the form $P_0 + \delta_i$ where $P_0$ is a constant. Substituting this solution into Eq. (1) and clearing the denominator results in Eq. (2), $$P_0(G - SINR_{target}(N-1)) = \qquad \text{Eq. (2)}$$
$$SINR_{target} \sum_{\substack{j=1 \\ j \neq i}}^{N} \delta_j + SINR_{target} N_0 L_i - G\delta_i$$

If $\delta_i$ is set such that the last two terms cancel and assuming that the network is loaded to the point where including $\delta_i$ in the summation term has little effect, a constant solution for $P_0$ is obtained indicating the solution is correct within the assumptions. For users far enough away from the base station, the inclusion of this term is significant and the approximate solution is not valid in that case as the system is not MAI limited. In FIG. 3, that condition is reached at approximately 30 km. As an example, values of N>77 for any cell radius>1 km ensure the contribution of the last term is less than 5%. Specifically, $P_0$ is found in Eq. (3), $$P_0 \cong \frac{\frac{SINR_{target}^2}{G} N_0 \sum_{j=1}^{N} L_i}{G - SINR_{target}(N-1)} \qquad \text{Eq. (3)}$$

Figure 4:
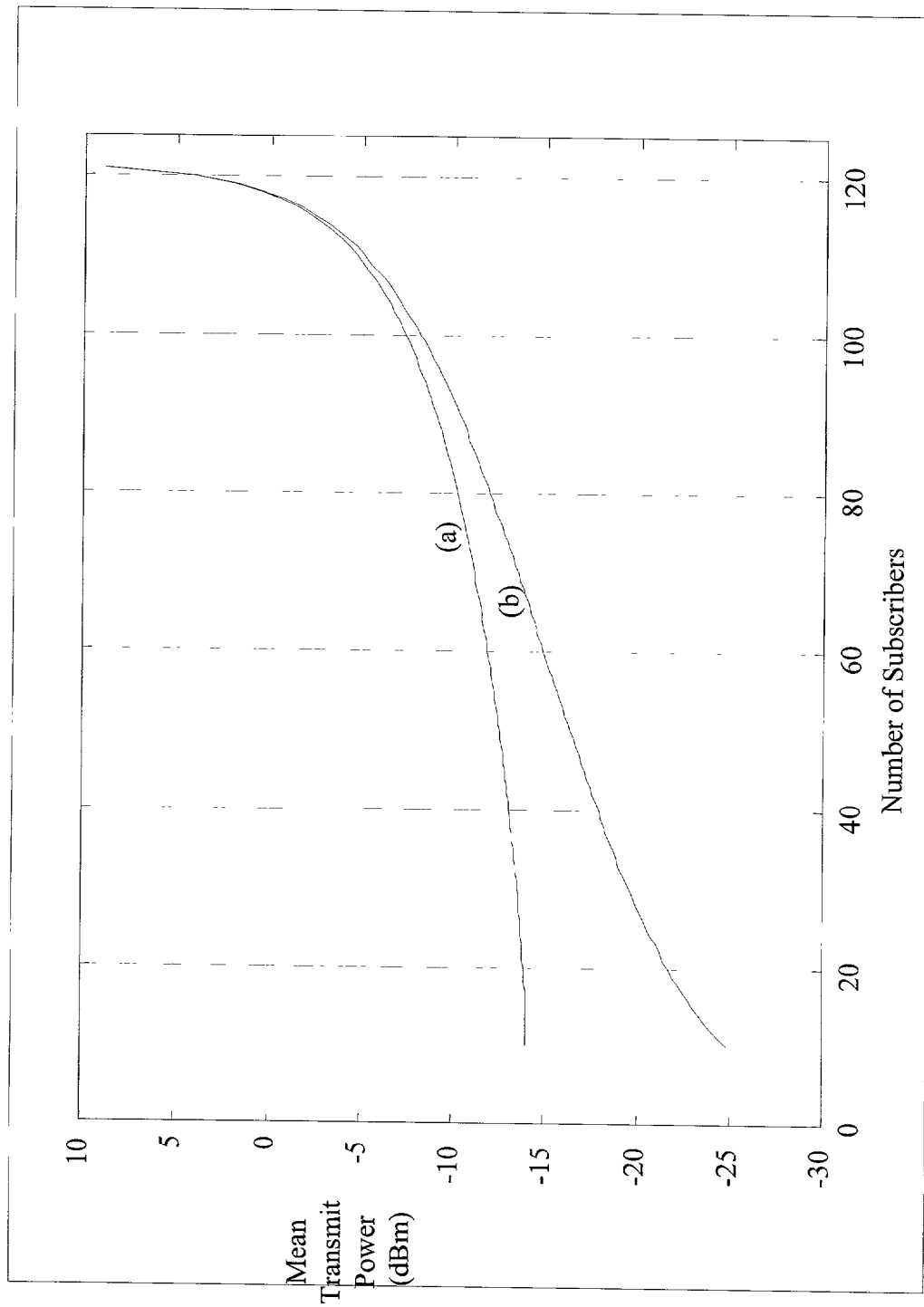
FIG. 4 shows the comparison of the mean transmit powers for all downlinks in a one-dimensional single cell of 2-km radius as calculated by the iterative and approximate methods.

FIG. 4 shows the comparison of the mean transmit powers for all downlinks in a one-dimensional single cell of 2-km radius as computed by performing the iterative method in accordance with Eq. (2) (line (a) which includes all terms in the summation) and approximately calculated by using Eq. (3) (line (b)). The parameters are those of the baseline and all users are assumed voice users. The figure shows that where the system "breaks", as defined by more than 5% of the users requiring greater than 30 dBm transmit power for their link, the exact numerical and approximate analytic solutions match exceedingly well. In other words, when the cell is heavily loaded, the approximate solution of Eq. (3) is quite close to the complete solution. Thus, Eq. (3) is a good approximation for a heavily loaded cell.

In the case of a heavily loaded cell, the preceding result illustrates an advantage of using RDTs over ODMA. The use of a repeater (as in ODMA) does reduce the effective path loss of users supported by the repeater. However, because the remote users must still satisfy Eq. (1) at the repeater, the required transmit power at the central base station to get an adequate signal to the repeater is unaffected by the effective path loss decrease. Consequently, the cell will still break with the same number of users. There is one advantage for using ODMA repeaters in that for loadings less than the critical value, the total power transmitted by the BS will reduce, resulting in a decrease in interference to other cells. In addition, users supported by the repeater will be able to operate at greater ranges from the base station.

According to an embodiment of the present invention, RDTs also have the aforementioned benefits associated with ODMA repeaters and, in addition, actually eliminate all the transmit power allocated to the remote users at the BS as that traffic is now carried on a landline to the RDT. Thus, users supported by an RDT represent additional capacity for the cell. The complexities of multi-cell networks are not reflected here. Although they will be included in the higher fidelity simulation to be considered next, the increase in network capacity by transition from a macro-cellular to micro-cellular architecture for the downlink within a given cell is still realized.

As seen from FIG. 4, the abrupt failure of the system as N approaches 121 users illustrates an important point. That is, even though the values of noise figure and path loss affect the precise value of $P_0$ at any given loading condition, the value of N that drives the denominator of Eq. (3) to zero is independent of these values and represents an upper bound on the number of users even with infinite power available. The bound is extremely tight. With 121 users, the required transmit power is 9 dBm. With 122 users, no solution exists. Even a 20 dB change in noise figure or path loss would not affect the maximum number of users in this idealized simulation. That observation suggests a key insight, as discussed next in connection with the SINR.

A simple model for the SINR of a downlink UE signal at the input to a Viterbi decoder at the UE is $$SINR = \frac{GP_T B}{P_{loss}(I_{in-cell} + I_{out-of-cell} + N)} \qquad \text{Eq. (4)}$$
$$= \frac{GP_T B}{P_{loss} I_{in-cell}\left(1 + \frac{I_{out-of-cell} + N}{I_{in-cell}}\right)}$$

In this expression, G is the processing gain, $P_T$ is the transmitted power, $P_{loss}$ is the path loss, $I_{in-cell}$ is the interference from users in the cell, $I_{out-of-cell}$ is the interference from users out of the cell, B is a antenna pattern factor, and N is the noise figure. The in-cell interference results from power transmitted at the base station and seen at the UE. With a given transmission power level for all in-cell UE downlinks, $I_{in-cell}$ is inversely proportional to $P_{loss}$. As such, the product of $I_{in-cell}$ and $P_{loss}$ stays largely fixed for modest path loss changes in loading conditions where the in-cell interference dominates (second term in parentheses is <<1). For network applications where capacity is a greater concern than coverage area, this argument suggests that maximum transmitter height above ground is not required. In terms of the simulation described in FIG. 3, cells less than 60 km in diameter (recall this is a simplified one-dimension model) could tolerate path loss increases without appreciable effect on capacity. In fact, the smaller the cell, the higher the path loss penalty that would be tolerable.

Simulations of two-dimensional multi-cellular networks similarly show that an RDT implementation in a spread spectrum, wireless network can both extend coverage and increase capacity. In fact, this effect is the primary motivation for increasing overall network capacity by reducing the cell size. Thus, according to one embodiment of the present invention, by dividing a macro-cellular downlink architecture (e.g., a single BS for every 10–15 km² of service area) into a micro-cellular system, with 3 to 6 additional downlink nodes of RDTs per BS, the practical capacity of the network over the same coverage area is increased, especially when the data link to each RDT is carried out-of-band. Furthermore, by restricting the architecture alterations of the wireless network to only the downlink side, the overall network cost and complexity are reduced.

Figure 5:
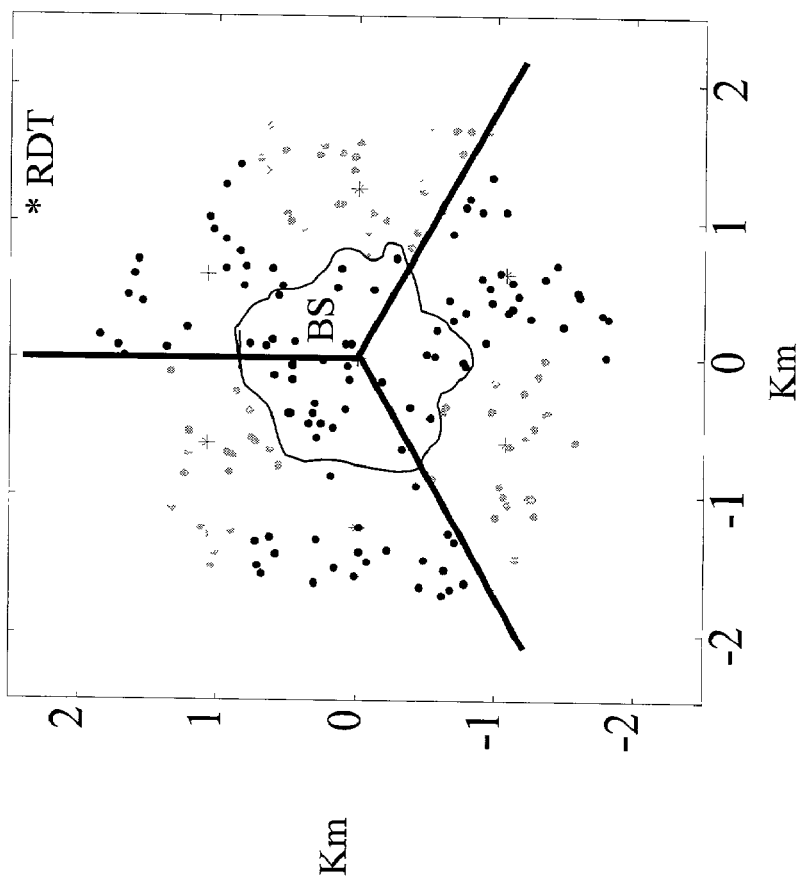
FIG. 5 shows a schematic depiction of a two-dimensional, one-cell W-CDMA model in a three-ring network with three sectors of the BS for simulation with associated RDTs.

FIG. 5 shows the structure of a two-dimensional, one-cell model in a three-ring network with three sectors of the BS for a more rigorous simulation of RDT implementations. The figure shows a laydown of UEs (dots) with assignment to the BS (dots inside the circular boundary) or an RDT (dots outside the circular boundary).

The black lines depict the sector boundaries of the BS, and the asterisks depict the RDTs. According to one embodiment of the present invention which is simulated here, there are 2 RDTs per sector, and they are positioned approximately midway towards the cell edge. The total simulation includes two rings of cells around the one shown in FIG. 5 for a total of 19 macro-cells and was performed using a W-CDMA network simulation model. Thus, with 19 tri-sectored base stations and 0, 1, or 2 RDTs per BS sector, cell capacity of the second simulation was computed with an average number of high data rate (384 kbps) users and voice (8 kbps) users per sector as a parameter. Details such as control channel overhead, out-of-cell interference, and random UE positioning are now included in this simulation.

Figure 6:
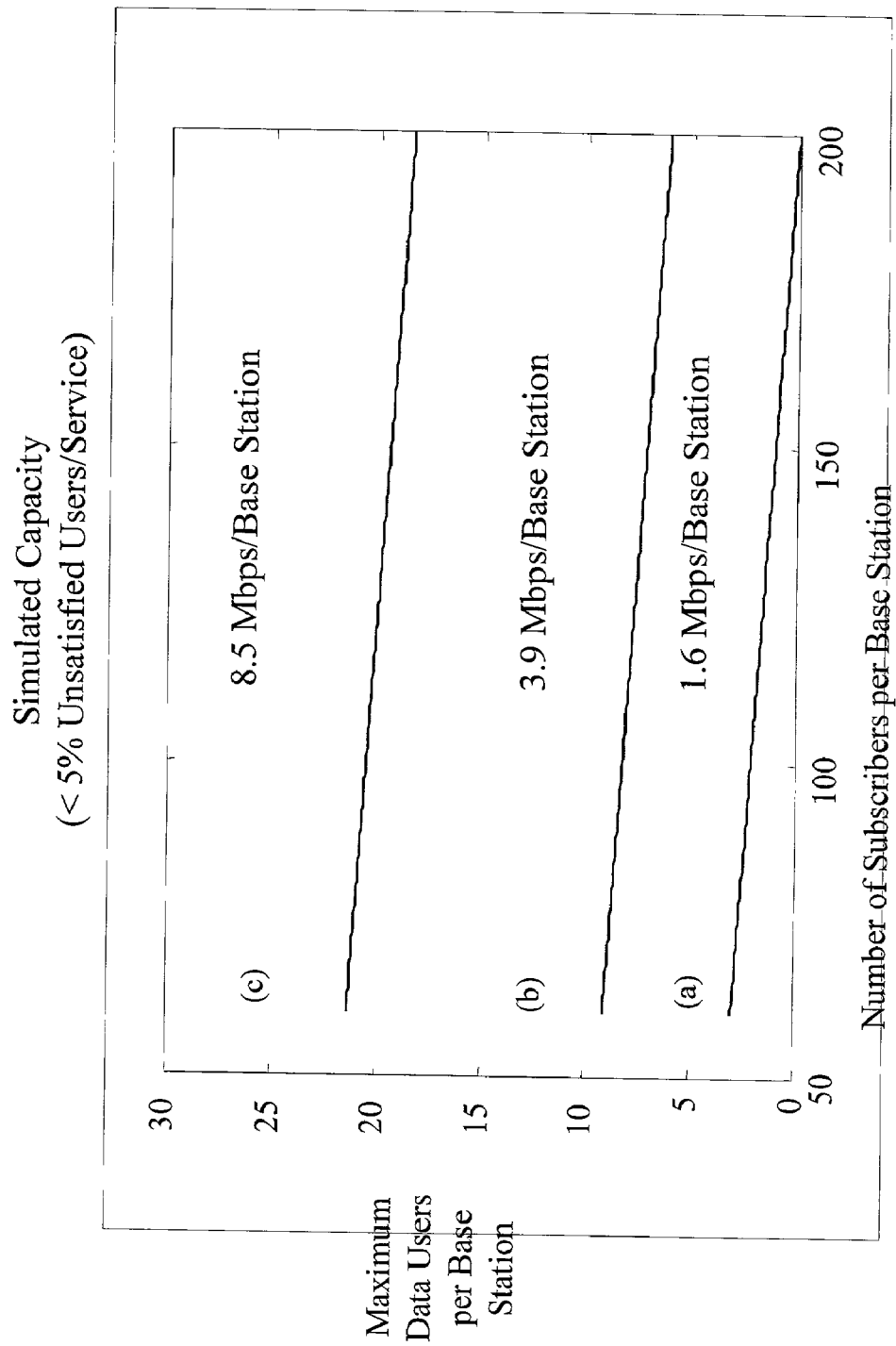
FIG. 6 shows simulated graphs of the maximum number of uniformly distributed data users per BS as a function of total number of UEs per BS, with and without the use of RDTs in each cellular cell.

As with the first simulation for the one-dimensional, one-cell network model, the second simulation uses system parameters from the 3GPP document TR 25.924 mentioned earlier, a Hata path loss model, BS height of 50 m, an RDT height of 20 m, 8 kbps per voice user, 384 kbps per data user, and with shadow fading neglected. FIG. 6 shows graphs of the maximum number of uniformly distributed data users per BS as a function of total number of UEs per BS that result from this simulation. In the figures, graph (a) shows the simulation result for a nominal W-CDMA network without any RDT, graph (b) shows the simulation result for a W-CDMA network with 3 RDTs per cell, and graph (c) shows the simulation result for a W-CDMA network with 6 RDTs per cell. The dotted lines in the graphs show the actual data resulting from the second simulation; with the solid lines showing the fixed capacity model fit or expected average performance, using a model of constant total data throughput (independent of quality of service distribution among UE) and Monte Carlo style simulation, of the actual data resulted from the second simulation.

As FIG. 6 shows in graph (b), the use of 1 RDT per BS sector (i.e., 3 RDTs per cell) improves the forward link (downlink) cell capacity approximately three-fold. Whereas, the use of 2 RDTs per BS sector (i.e., 6 RDTs per cell) improves the forward link cell capacity approximately five-fold, as shown in graph (c) in the figure. Returning to the discussion on sensitivity to path loss, with the BS at the disadvantaged height of 20 m and the RDT at 20 m, or with all path losses from the RDT arbitrarily increased by 3 dB for the second simulation, one observes essentially no significant change in system capacity. Thus, the earlier observation suggesting that disadvantaged citing of the BS and RDT is not an overriding concern is substantiated with the high fidelity of the second simulation.

The above two simulations and mathematical analysis show that transformation of macro-cells within a network to a collection of micro-cells increases the practical capacity per cell and can be achieved independently for the downlink and/or the uplink architectures. However, according to one embodiment of the present invention, an asymmetrical or dual-scale network structure wherein the use of RDTs are restricted to the downlink is used to provide substantive cost benefits, which are proven next.

Supporting a micro-cellular architecture for the uplink to match that proposed for the downlink is not cost effective for three reasons. First, while the uplink physical layer processing could be accomplished at the remote emitter with user decisions transferred back to the BS, that processing is more demanding for the uplink than the downlink. That is because the descrambling and despreading operations of the uplink must occur with floating point accuracy and at a wide range of potential code delays due to the unsynchronized nature of uplink reception. The downlink spreading and scrambling operations, on the other hand, may occur using binary math with a given code delay. Additionally, SINR improvement functions such as maximal ratio combining, multi-user detection, and space time adaptive processing, which are used to mitigate the stringent UE power limitations, further amplify the computational resources required for the uplink. Thus, the combination of high processing demand with low latency requirements leads to high equipment costs for the uplink.

Secondly, the base band in-phase and quadrature data may be transmitted from the user back to the BS at some level of floating point accuracy, thereby removing the need for any uplink processing capability at the remote site. However, obtaining acceptable performance from the uplink receiver algorithm in an uplink RDT would require data samples at twice the W-CDMA system bandwidth per antenna. This equates to approximately 200 Mbits/sec per antenna for 12 bit accuracy. Such an uplink data load from the RDT to the base station is not cost effective given existing bandwidth cost. The required data rate for support of the downlink, however, is substantially lower. The expected bandwidth required of the downlink trunk line is readily computed. For example, if a downlink RDT is to support N users, the total trunk bandwidth is:

$$BW_{trunk} = R_{chip} * 2 * (\log_2(N) + 1) \qquad \text{Eq.(5)}$$

The chip rate, $R_{chip}$, for W-CDMA is approximately $3.8*10^6$ chips/sec. The factor of 2 is to include both in-phase (I) and quadrature (Q) channels. As each user's I and Q sequences are elements of the set $[-1,1]$, only $\log_2(N)+1$ bits are required to represent the superimposed sequence of integers. For a W-CDMA system with 50 remote users (half the number of baseline users per sector), the required trunk bandwidth is approximately 51 Mbits/sec which is about the equivalent of a T-3 line. This calculation assumes that all code generation is done at the base station. If the RDT is capable of generating the codes and spreading the sequences, i.e., taking up the physical layer processing, only the unspread user data must be transmitted and $BW_{trunk}$ is reduced by the average spreading factor and error correction coding rate. Assuming 90% voice users and 10% high-speed data users, the required bandwidth is then 2.2 Mbits/sec, which is about the equivalent of a T1 line.

The third justification for the dual-scale network architecture is that a prevalent usage paradigm for third generation (3G) wireless services may demand higher data rates for the downlink than the uplink. For example, web browsing is such an activity. The added capacity that a micro-cellular uplink would offer is, thus, not cost-effective and/or may not even be required.

A dual-scale network architecture involving a macro-cellular uplink and a micro-cellular downlink has thus been shown to improve practical capacity of the network. The dual-scale architecture is also asymmetrical in that the communication downlink is handled differently from the communication uplink, which also has been shown to provide substantial cost benefits as well.

Having demonstrated that the invention of a dual-scale architecture has unique, substantial benefits, an RDT implementation in the downlink section of a spread-spectrum based wireless network that achieves those benefits is now explained in accordance to embodiments of the present invention.

Figure 7:
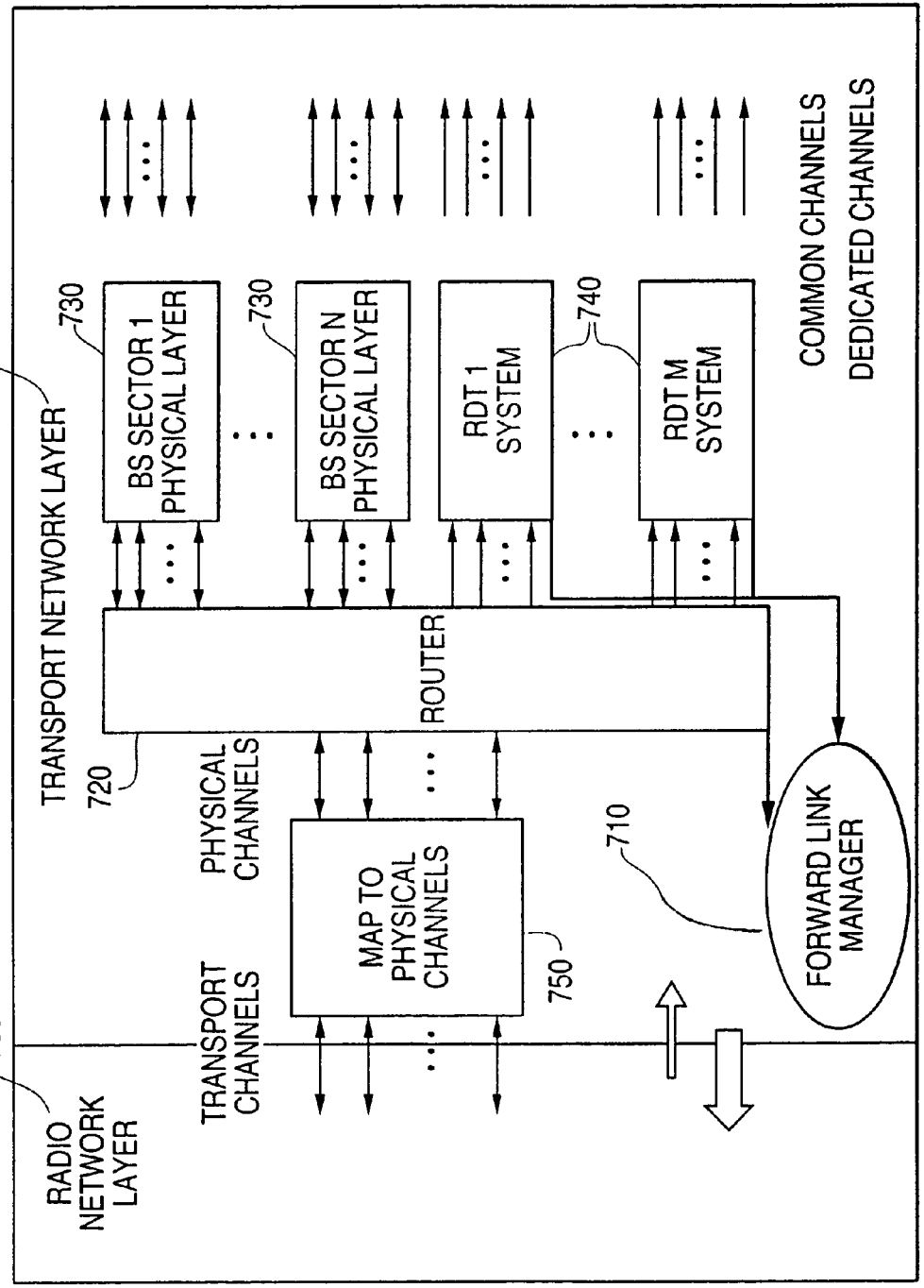
FIG. 7 shows a block diagram of a W-CDMA downlink processing architecture modified to accommodate the RDT systems in accordance to one embodiment of the present invention.

FIG. 7 shows a block diagram of a spread-spectrum (e.g., W-CDMA) downlink processing architecture modified to accommodate the RDT systems in accordance to one embodiment of the present invention. There are three desired components of a RDT implementation which requires alterations to, for example, a standard W-CDMA architecture. The first desired component includes a Forward Link Manager (FLM) 710, which is added to the transport network layer 700 of an W-CDMA architecture to control the availability of an RDT for registration or access of a new UE, and thus for assignment in the Radio Network Layer 780. As is known to one skilled in the art, the transport network layer and the radio network layer refer to layers in a standard open system interconnect (OSI) reference model for a communication architecture.

The second desired component for an RDT implementation includes the RDT system 740 itself. The third desired component for an RDT implementation includes a Router 720 which is also added to the transport network layer 700 to direct the downlink transport channels from the radio network layer 780 to either a BS sector or an associated RDT node for downloading to the UEs. Communication signals to be transmitted from the BS to the UEs first enter the radio network layer 780, which is responsible for the routing and switching of the communication signals into transport channels, as shown in FIG. 7. The downlink transport channels are then translated into corresponding physical channels by a map 750 in the transport network layer 700. The data from the physical channels are subsequently routed by the Router 720 as physical layer inputs to either a local BS sector via its physical layer 730 (another layer in the OSI reference model) or a RDT system 740 at an associated RDT node, where they are then forwarded to the UEs. According to an embodiment of the present invention, the Router 720 is capable of independently assigning downlink and uplink traffic to the radio sources (BS or RDTs), as the RDTs only support downlink traffic. Where an adequate inter-BS link is available, the Router 720 can also direct downlink traffic to one BS, via an RDT as needed, while the uplink traffic is supported by another BS resource in another cell. Both the Router 720 and the RDT systems 740 transmit information to the FLM 710 that is used in link management decisions.

Figure 8:
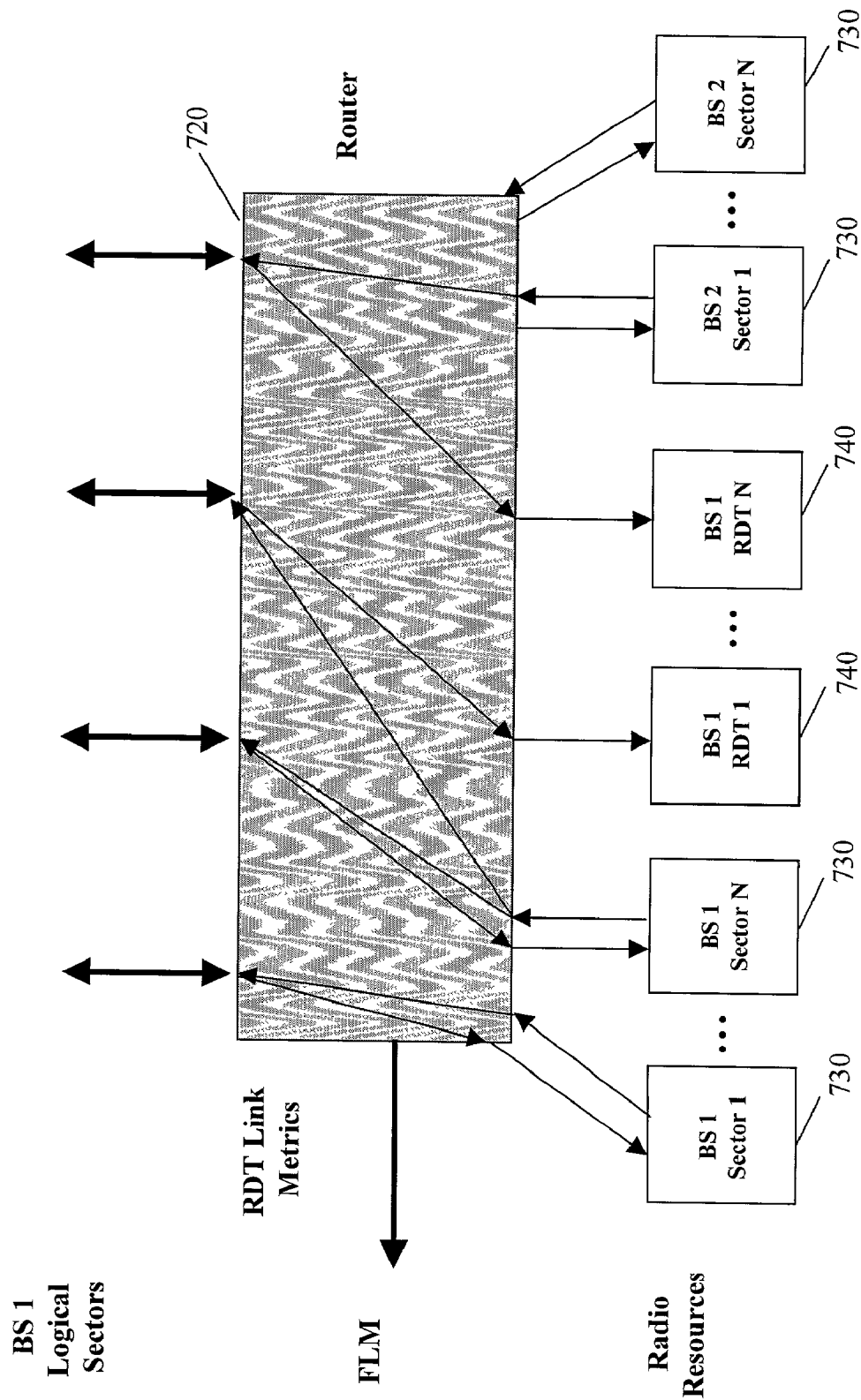
FIG. 8 shows a schematic diagram demonstrating the ability of a router of the architecture shown in FIG. 7 to join uplinks and downlinks from varied radio resources and present a sector with collocated uplink and downlink to the remainder of the transport network layer shown in FIG. 7, in accordance to an embodiment of the present invention.

The function of the Router 720 is to direct downlink data coming into the BS to the physical layer processing system for the radio resource that will support such data, i.e. a BS sector physical layer 730 or an RDT system 740. A standard BS already implements the ability to direct downlink data to an appropriate sector. According to an embodiment of the present invention, each RDT system is logically treated as an additional sector for the BS, and the wireless network includes the ability to independently direct downlink and uplink data to different radio resources. Specifically, all uplink traffic may still be received at the BS while some downlink traffic may be transmitted from an RDT system at a remote site. An appropriate paradigm for describing the Router 720 is that of a filter at all interfaces of the physical layer with the remainder of the transport network layer 700. While the uplink and downlink may be supported by different radio resources, the Router 720 presents a single logical sector for all allowable downlink and uplink pairings. For example, one logical sector may be formed from a single BS sector. Another logical sector may be formed from an RDT-based downlink coupled with the uplink of a BS sector. Yet another logical sector may be formed from an RDT-based downlink of the local BS and the uplink system of a sector belonging to a different BS. FIG. 8 graphically depicts this switching function, i.e., the ability of the Router 720 to join uplinks and downlinks from various radio sources and present a sector with collocated uplink and downlink to the remainder of the TNL 700. While the Router 720 makes the connections, the FLM 710 determines what connections are made during access procedures and handoff procedures. Link quality metrics for the data links to the RDT systems 740 are also reported to the FLM 710. The logical sector paradigm allows the Router 720 to be introduced into existing operator equipment with minimal modifications to the latter. Thus, the dual-scale network architecture of the present invention can be applied to any spread-spectrum wireless network.

Figure 9:
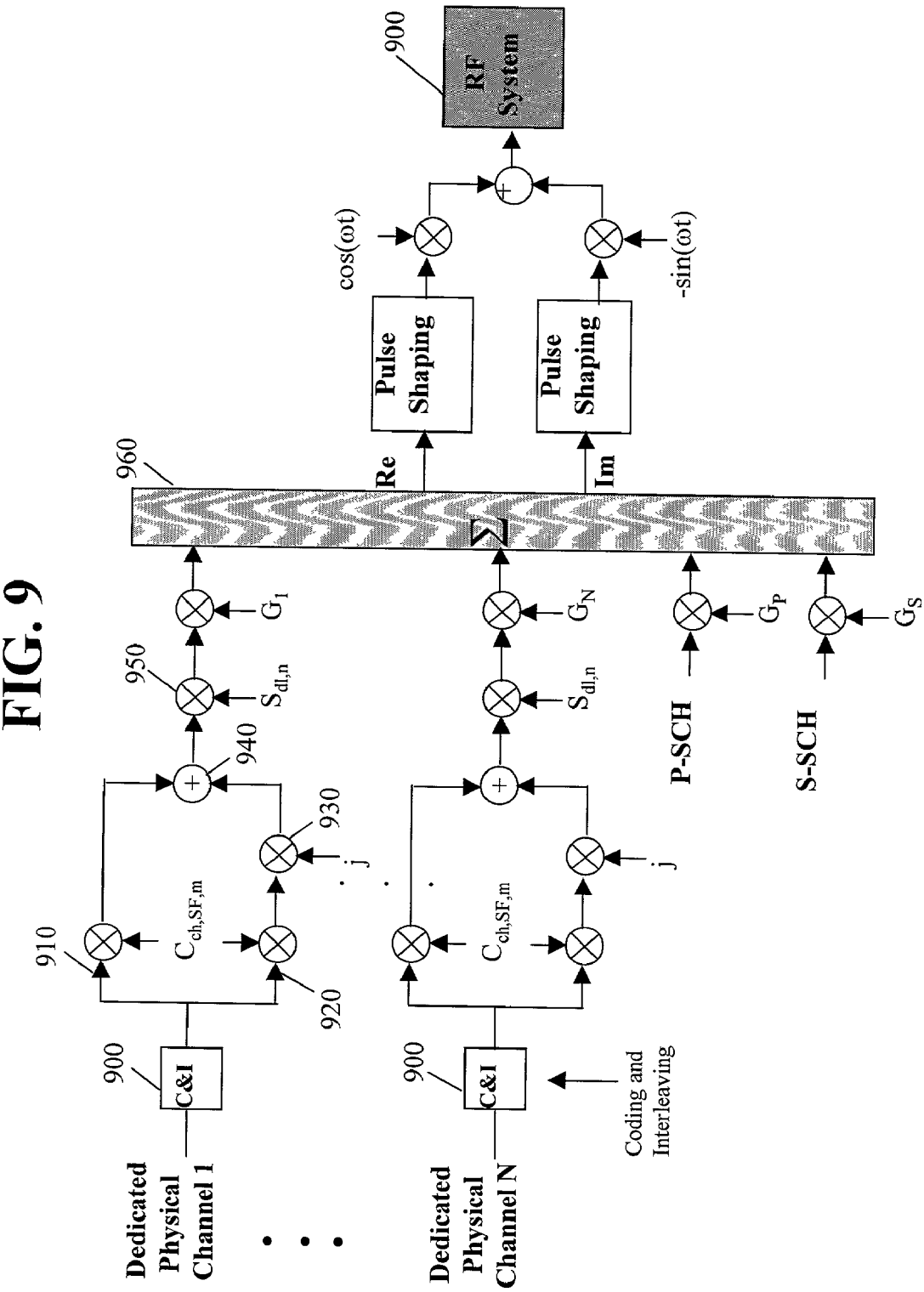
FIG. 9 shows a block diagram of an RDT system, in accordance to one embodiment of the present invention.

According to an embodiment of the present invention, the functionality of the RDT system 740 may be described as that of a physical layer processing for a sector with the addition of a communication backbone that conveys information from the BS to the RDT, which is at a remote site. Except for the communication backbone, the RDT is simply treated as another sector of the BS, with all RDTs sharing a communication trunk line or serviced with independent trunk lines. Any vertical slice between functions of the RDT and the BS may be where the trunk line transmission occurs, dividing processing steps between the BS and the RDT. FIG. 9 shows a block diagram of the RDT system 740, in accordance to one embodiment of the present invention, where $C_{ch,SF,m}$ is the spreading code for the channel, $S_{dl,n}$ is the downlink scrambling code, and $G_N$ is a gain factor. Two of the common channels, the primary synchronization (P-SCH) and the secondary synchronization (S-SCH), are shown. Other common channels including pilot and access channels are also summed but not shown in the figure. The radio frequency (RF) system 700 includes a digital-to-analog converter, a power amplifier, a matching network, and antennas.

Each RDT system 740 emits the same common channels as a sector (e.g. pilot channel, primary synchronization channel, secondary synchronization channel, access channels, paging channels, and common broadcast channels). The RDT system is assigned a unique set of channelization codes in a manner identical to that in which codes are allocated between BS sectors in the wireless network. A user-defined portion of the physical layer processing may be accomplished in the BS. This may range from the logical mapping of transport channels into physical channels to execution of the coding, interleaving, spreading, and scrambling operations. The output of this physical layer processing is conveyed to the RDT via an available communication backbone. Any functionality of the physical layer processing not performed at the BS may be accomplished at the RDT, and the channels are converted to a single radio frequency signal, i.e., the downlink signal. The RDT system 740 then uses an available communication trunk line to transmit data back to the FLM 710 for use in determining RDT availability for additional registration or access requests by UEs.

Figure 13:
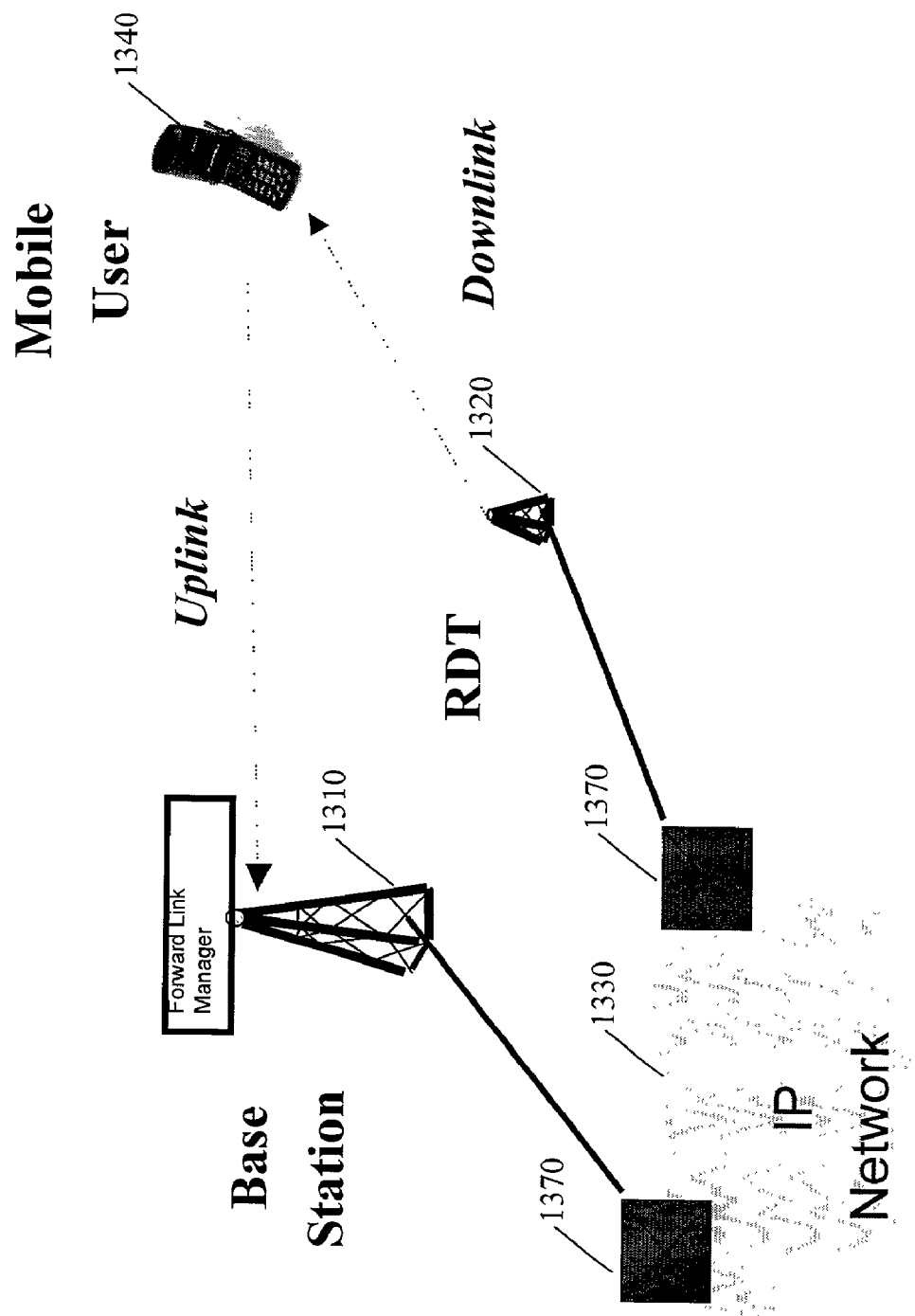
FIG. 13 shows an Internet Protocol (IP) network acting as a communication trunk line between an remote downlink transmitter and a base station in accordance to one embodiment of the present invention.

Consequently, the RDT system 740 represents an additional radio resource for a spread spectrum wireless network with physical constraints that may be different from the BS sectors themselves. For instance, the available data rates over the communication trunk line between an RDT and a BS can be limited to the equivalent of a T-1 line (~1.5 Mbps) and even vary with time if the link is a shared one. According to the embodiments of the present invention, the communication trunk line between an RDT and a BS may be implemented by a landline (i.e., wired) connection, such as via an Internet Protocol (IP) network, an optical data link, or a designated frequency band, such as an out-of-band RF, for wireless connection. FIG. 13 shows the use of an IP network 1330 as the communication link or trunk line between an RDT 1320 and its BS 1310, in accordance to one embodiment of the present invention. The forward link manager or FLM is located at the BS 1310. The RDT 1320 and the BS 1310 are connected to the IP network 1330 via IP routers 1370, which may be used to implement the routing functions of Router 720 shown in FIG. 7, as understood by one skilled in the art. The IP network 1330 can be a dedicated private data network for the communication trunk line, or it can be a public data network such as the Internet.

Referring back to the physical constraints of the RDT system, radiated power of an RDT also may be limited to a value substantially below that of the BS to lower the equipment cost of an RDT system. In addition, processor capacity may also be limited at the RDT such that no more than a fixed number of spreading, scrambling, and summing operations may be performed. As such, a capability is required to manage and optimally use the radio resources offered by the RDT. This functionality may be provided by the FLM 710, which is described next.

According to an embodiment of the present invention, the FLM module 710 may be software implemented at the BS. It receives information that is made available by the Router 720 and the RDT systems 740 for use in the FLM's decision process. That information includes details of a UE access or paging request as well as RDT performance metrics. The FLM 710 then makes decisions such as whether to use the RDT for UE access or paging based on a defined set of rules. Once the decisions are made, the FLM 710 submits them to the radio network layer 780, which either accepts the request or defers it to another radio resource in a different cell of the network. These FLM aspects are further discussed below with reference to FIG. 10.

Figure 10:
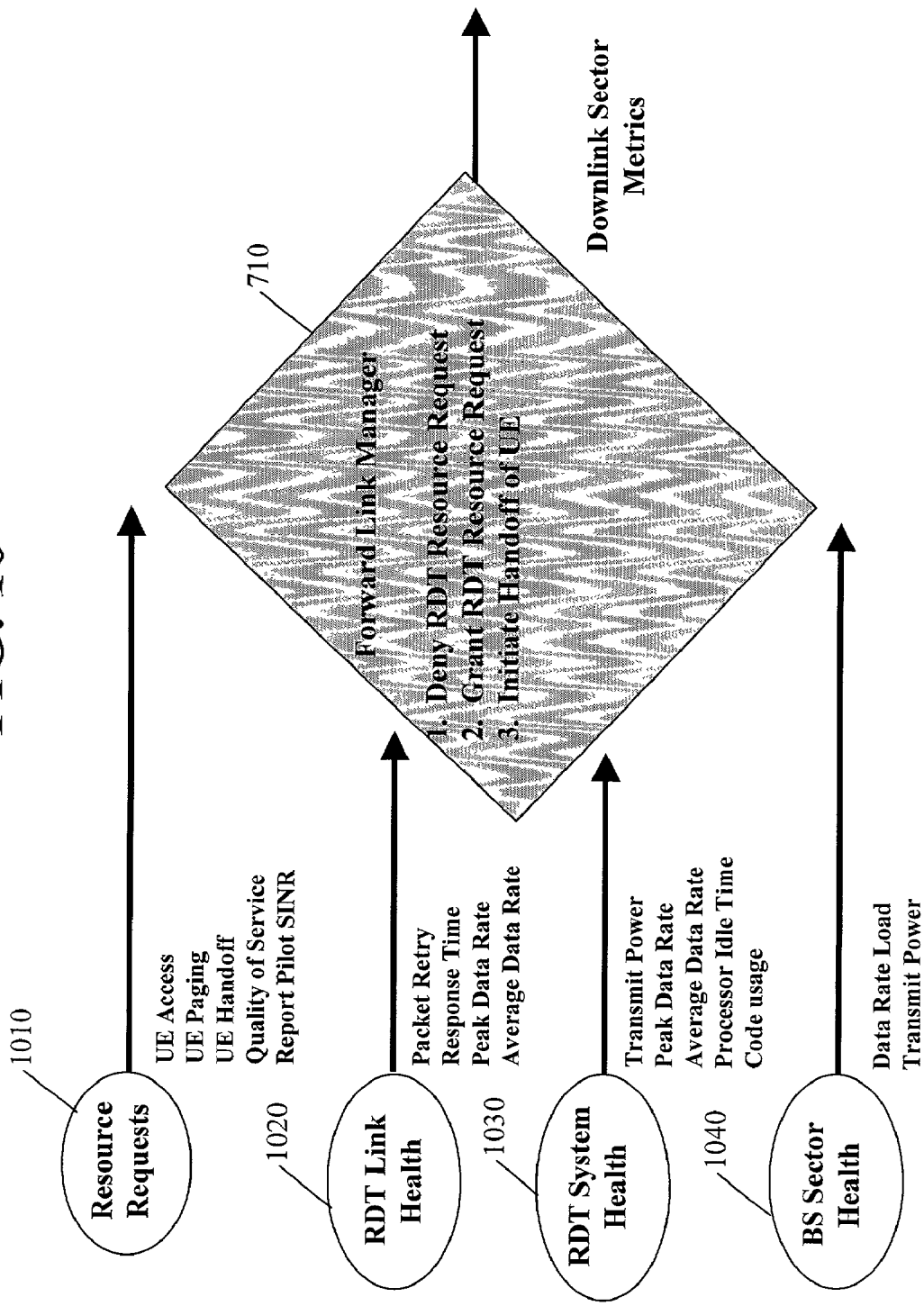
FIG. 10 shows the inputs, possible decisions, and outputs of the Forward Link Manager in accordance to one embodiment of the present invention.

FIG. 10 shows the inputs, possible decisions, and outputs of the FLM 710 in accordance to an embodiment of the present invention. A variety of inputs are desired to aid the FLM 710 in making decisions. For instance, the Router 720 may provide metrics describing the health of the communication trunk line out to the RDT, i.e., the RDT link health 1020. For a packet-based trunk line protocol, a representative set of parameters includes the average number of retransmits required for packets sent to the RDT, average time for successful reception of packet at the RDT, peak data rate, and average data rate. Likewise, other communication protocols may be assessed by other appropriate link health measures. All of these are valuable in ascertaining the ability of the trunk line to support an additional UE with sufficiently low latency. The Radio Network Layer 780 may provide the FLM 710 with resource requests 1010 for downlink support such as UE access, UE paging, and UE handoff. In addition, the desired quality of service (QoS) for the UE and its reported pilot SINR may be made available. The RDT system 740 itself may report current resource usage parameters such as total transmit power, processor idle time, the average and peak data rate coming into the RDT system 740, and the fraction of its assigned channelization codes used. Furthermore, metrics describing the loading of the downlink BS sector that the RDT is augmenting, i.e., BS sector health 1040, may be passed from the Radio Transport Layer 700.

Figure 11:
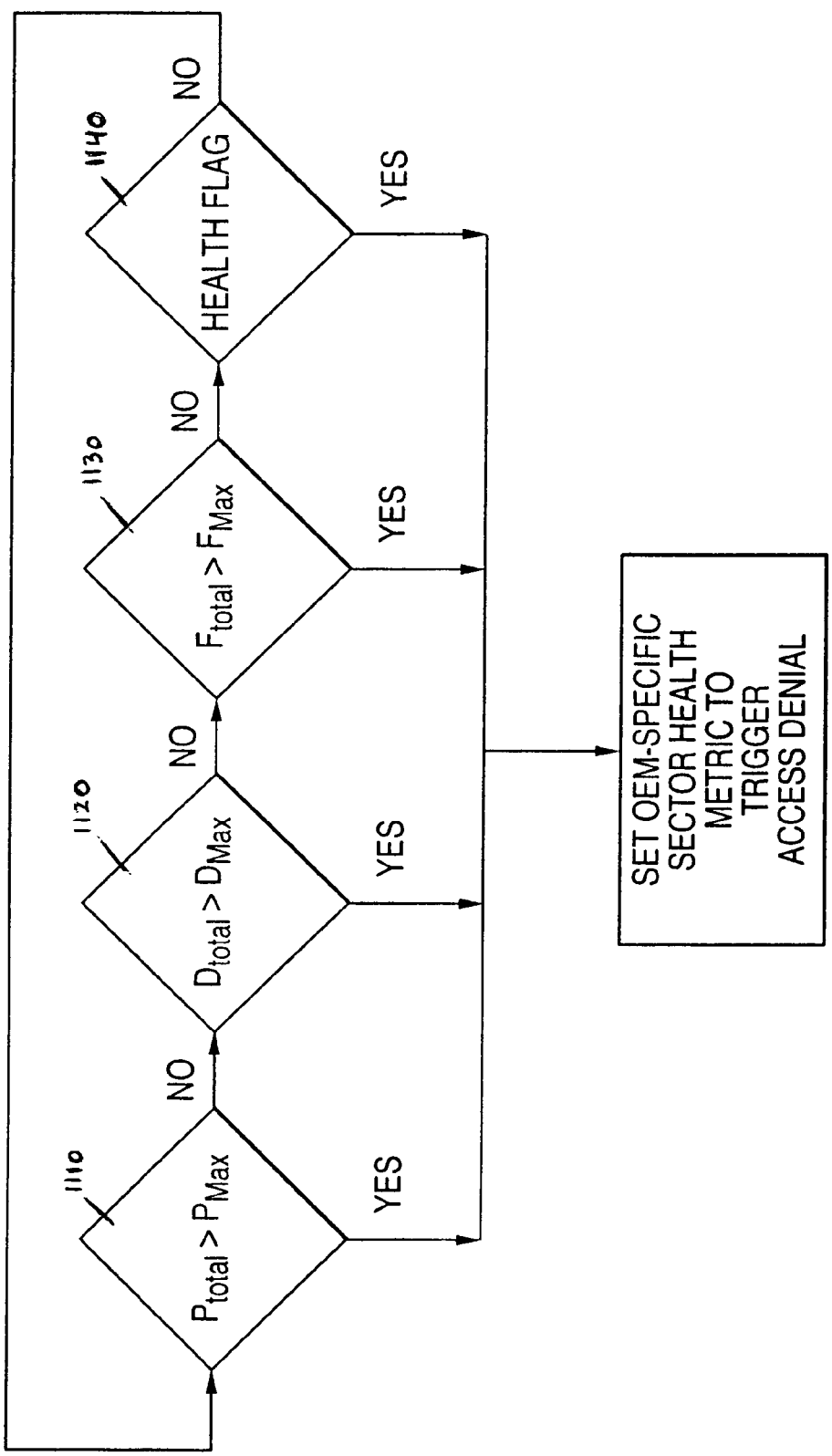
FIG. 11 shows a first-tier decision process as implemented by the FLM 700 shown in FIG. 9 in accordance to one embodiment of the present invention.

The FLM 710 then uses the above inputs to make a series of decisions. FIG. 11 shows a first tier of the decision structure implemented in the FLM 700 for determining whether any incoming UE service requests should be serviced by a particular RDT in a wireless network cell, in accordance to an embodiment of the present invention. P is the total radiated power at the RDT, D is the total data rate carried by the trunk line between the RDT and the BS, F is a measure of the processor load at the RDT, and Health Flag is set whenever an RDT diagnostic routine fails. The first tier of processing is continuous and asynchronous to any UE service requests. In this tier, the FLM 700 continually compares reported RDT resource usage (such as power, data rate, and processor capacity) to user-defined hard limits and forces the Radio Network Layer 780 to defer any additional load for the RDT if and resource exceeds the hard limits. In other words, as shown by conditions 1110, 1120, 1130 and 1140 in FIG. 11, if the hard limits of P, D, or F are exceeded or the Health Flag is set, all subsequent requests for UE support from the RDT are denied.

Figure 12:
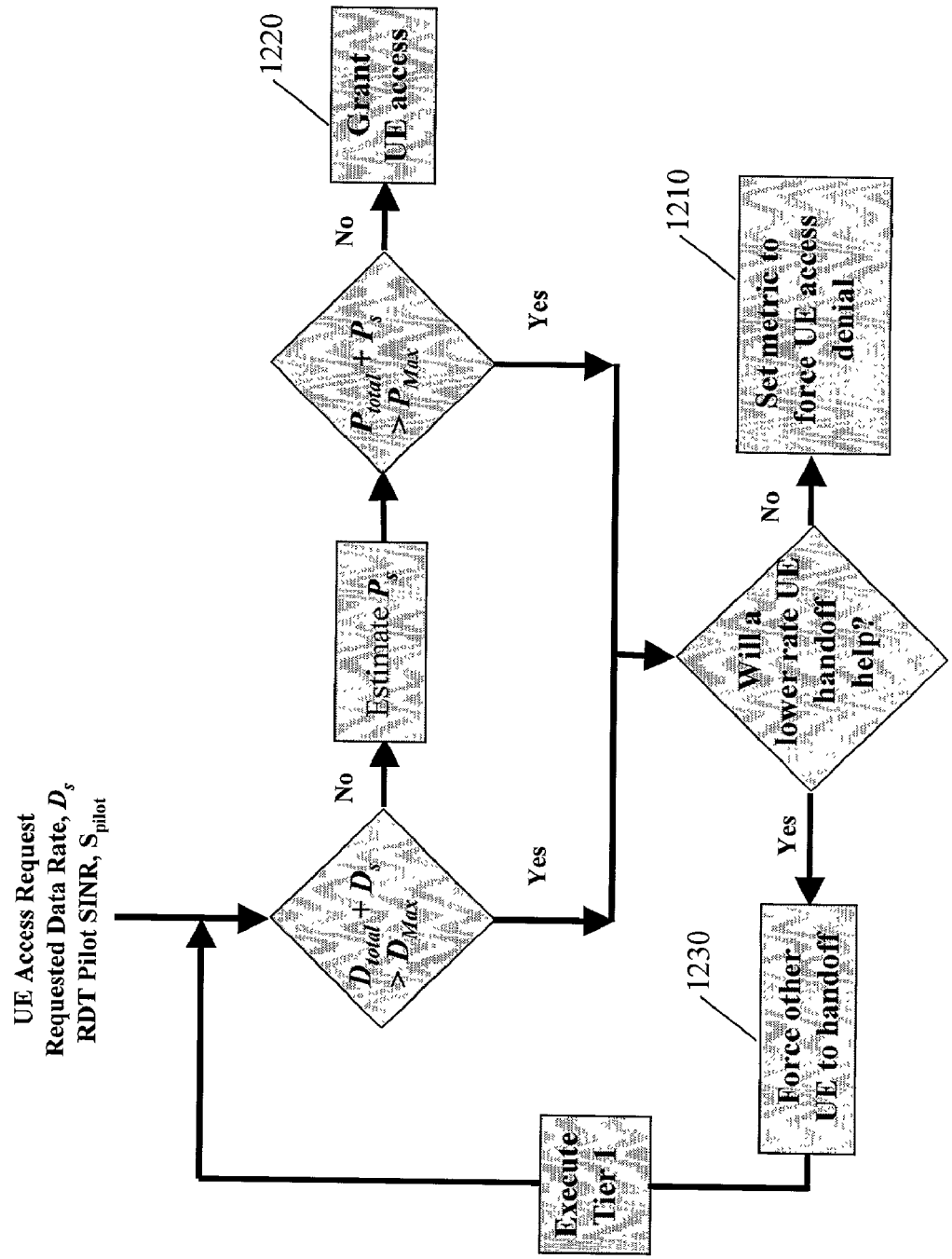
FIG. 12 shows a second-tier decision process as implemented by the FLM 700 shown in FIG. 9 in accordance to one embodiment of the present invention.

The second tier of FLM decisions predict the impact of offering the requesting service at the RDT. At this level, several supporting decisions may be made, including: 1) will providing the service force the RDT to exceed resource limits?; 2) is a channelization code available?; 3) will providing the service leave enough resources to support another UE request?; and 4) if an existing RDT-assigned UE using less resources is to be reassigned to the BS downlink sector, can the request UE service be provided? For instance, a voice user may be placed in handoff for reassignment to the BS downlink section in order to support a high data rate user. FIG. 12 shows a second-tier FLM decision flow in accordance to one embodiment of the present invention. Presuming the first tier processing has not detected any resource allocation violations, the second tier examines each new ULE service request to determine the impact of offering the service. Furthermore, the FLM decisions made in the second tier are generally more sophisticated and are directed toward maximizing the load supported by the RDT. Based on the answers to the aforementioned questions in the second tier, which are derived from the FLM inputs, the FLM 700 make possible final decisions, including: 1) denying the RDT resource request 1210; 2) grant the RDT resource request 1220; or 3) force a UE currently supported by the UE into handoff 1230. Other decisions may also be made, such as deferring UE request to the BS downlink sector if it is lightly loaded. Implementation of the second-tier FLM decisions are left to the Radio Network Layer 780. This is done by generating downlink sector metrics that, in turn, are used by the Radio Network Layer 780 to manage downlink resources. In this manner, the RDT may be controlled by the Radio Network Layer 780 just as other BS downlink sectors are controlled.

The specific outputs of the FLM 710 may be whatever metrics that are used by the existing spread-spectrum based wireless network that is to be augmented by the dual-scale architecture of RDT systems of the present invention. Thus, the dual-scale network architecture of the present invention can be applied to any spread-spectrum wireless network. Two sample metrics are the ratio of transmitted power to maximum power and the ratio of current data throughput to maximum allowed throughput. The values of the metrics may be set to force the Radio Network Layer 780 to perform a desired action.

The above description for a micro-cellular architecture for the downlink enables the coding and spreading functions to occur either at the BS or the RDT system at a remote site, depending on the communication trunk line data throughput capability and processing resources allocated to the remote site. The coding, interleaving, spreading, scrambling, and RF subsystem elements can be implemented at the RDT with low cost equipment, as will be further explained later. The FLM 710 may be implemented by software and therefore has essentially zero recurring cost. The communication trunk line between an RDT system and a BS may also be implemented with Internet Protocol (IP) packet structures, as mentioned earlier, which allows low cost commercial routers to be used for the Router 720. Additionally, if all physical layer processing occurs in the RDT system at the remote site, the data throughput requirements for the trunk line are modest. Thus, a dual-scale, asymmetrical architecture for a spread-spectrum based, high-capacity wireless network can be implemented in a cost effective manner.

Now that a high level design of a baseline-RDT system for a spread-spectrum, wireless network has been shown and described, a detailed design of the baseline-RDT system at the component level is provided next as a representative implementation of a RDT system in accordance to one embodiment of the present invention.

Figure 14:
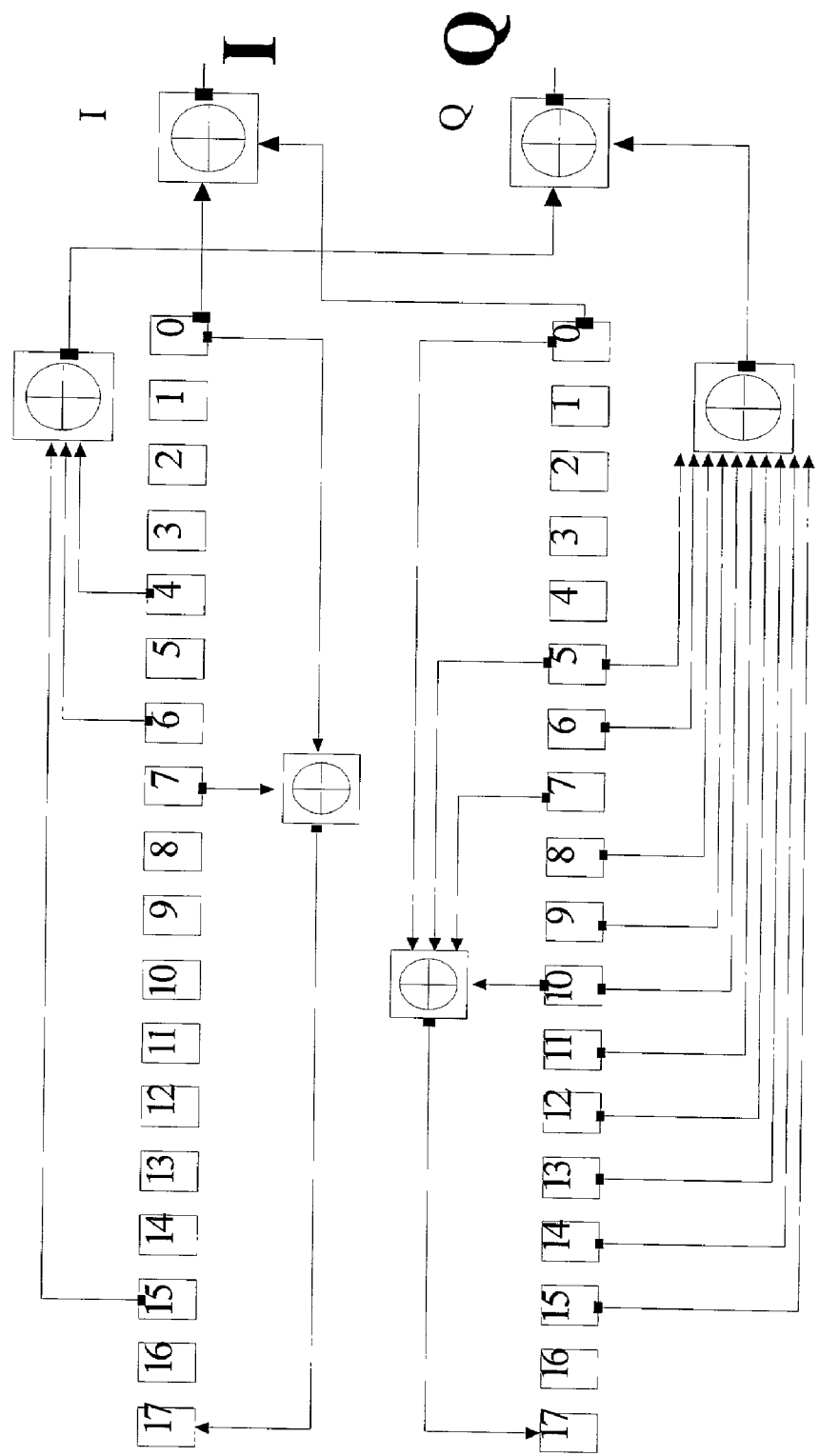
FIG. 14 shows a scrambling code generator that may be employed to support the physical layer processing at a RDT system in accordance to one embodiment of the present invention.
Figure 15A:
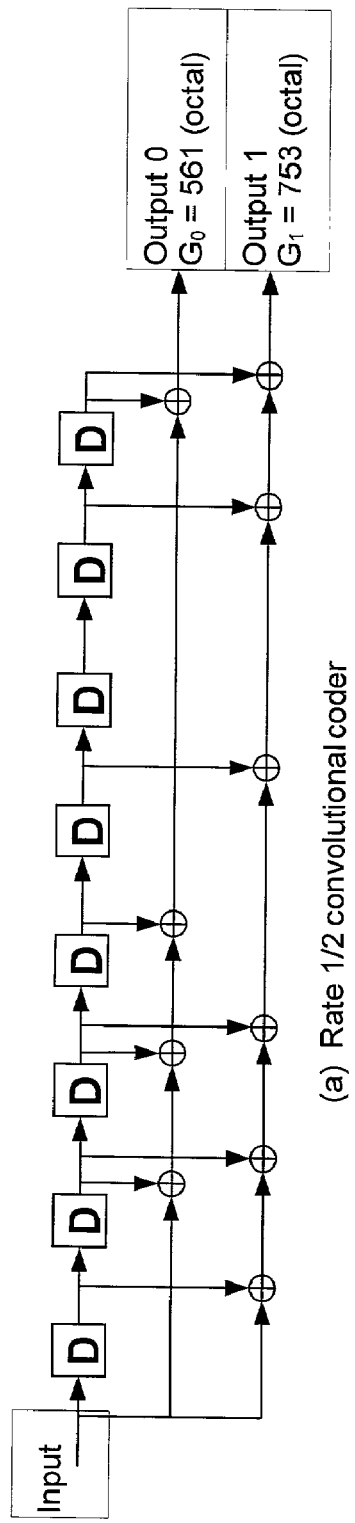
FIGS. 15A, 15B and 16 show various convolutional encoders that may be employed to support the physical layer processing at a RDT system in accordance to one embodiment of the present invention.
Figure 15B:
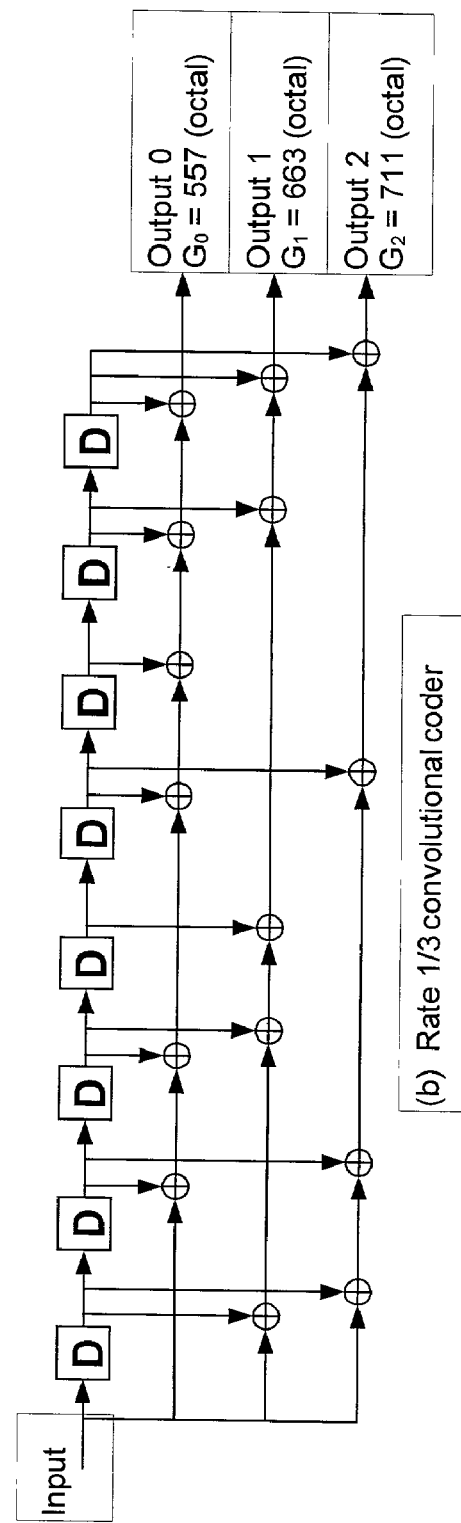
Figure 16:
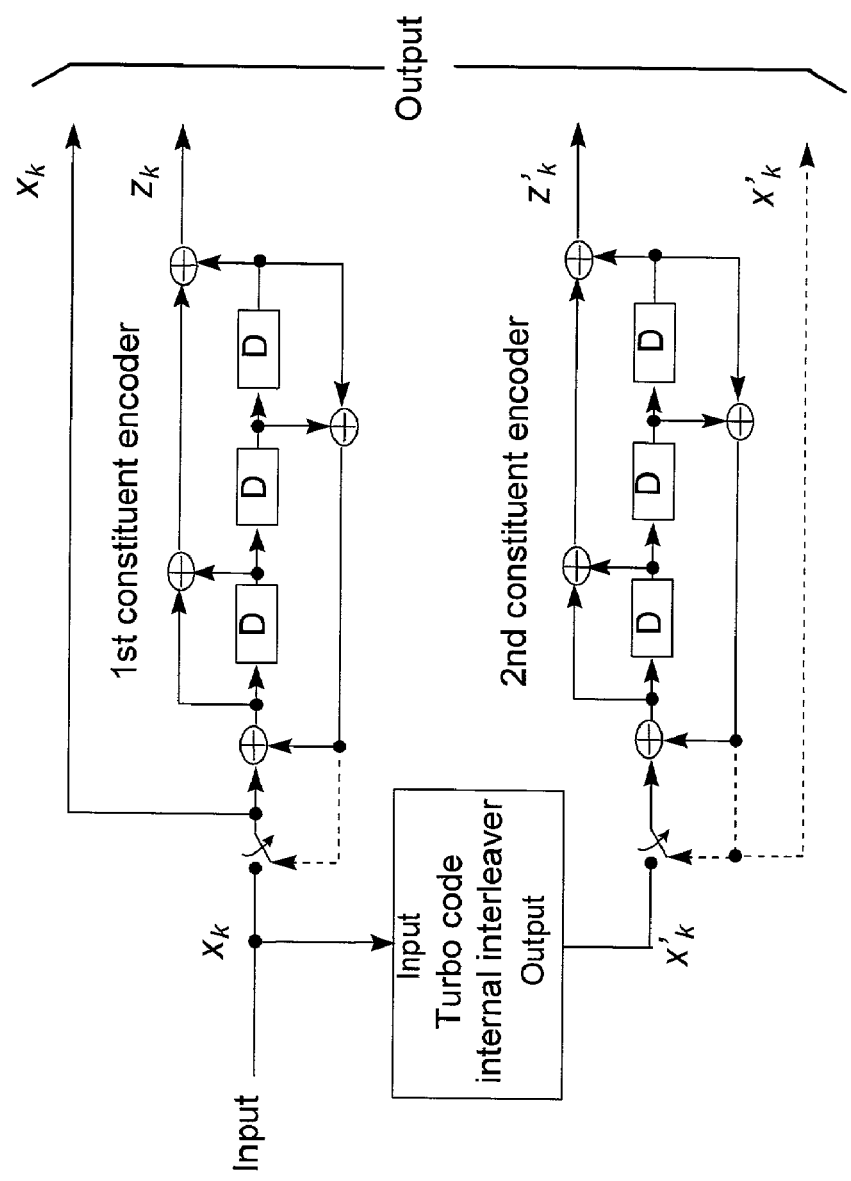

According to an embodiment of the present invention, there are two principle subsystems in an RDT system at the remote site: 1) the digital processing, which includes the digital-to-analog conversion aspect; and 2) the high power RF equipment. First, the RDT system includes a digital processing capability to complete the physical layer processing, including coding, interleaving, spreading, and scrambling. These functions were shown earlier in FIG. 9. In addition to the partially processed data received by the RDT system over the trunk line, control data including a channelization code identifier for each UB Dedicated Physical Channel, the scrambling code offset, a network timing reference, coding format indicator, and rate matching information may also be sent from the BS to the RDT system. Detailed diagrams of the coding and scrambling code generation functions are shown in FIGS. 14, 15, and 16.

Referring back to FIG. 9 with reference to FIG. 7, communication signals from the UEs are translated into physical channels and routed to a BS sector physical layer or an RDT system. Each physical channel is dedicated to a UE and includes two sub-channels for carrying two different streams of information. The first stream of information is carried by the data sub-channel and includes actual data to be sent to the UE. The second stream of information is carried by the control sub-channel and includes control information such as training bits, power control bits, and structural bits. If a physical channel, such as dedicated physical channel 1 in FIG. 9, is routed to an RDT system, the two streams of information from the physical channel is then fed into a coding and interleaving module 900 of the RDT system. Only the data stream is encoded by module 900. FIGS. 15 and 16 show various different encoding methods that can be used for performing the coding and interleaving, as provided in the 3GPP specifications mentioned earlier. For instance, as is known in the art, the coding format for the wireless network may require either rate 1/2 or rate 1/3 convolutional encoding, which can be implemented by the encoders shown in FIGS. 15A and 15B. These coding functions may be implemented either in a programmable processor or a dedicated integrated circuit (IC) chip within the RDT system. Alternatively, as also known in the art, the coding format for the wireless network may require two-dimensional convolutional encoding (also called Turbo coding), as shown in FIG. 16. This coding function also may be implemented either in the programmable processor or a dedicated integrated circuit (IC) chip within the RDT system. Furthermore, the channelization codes (Orthogonal Variable Spreading Factor codes) are amenable to permanent storage in a look-up table. The combination of these factors makes implementation of the baseband digital processing suitable for a static ram field programmable gate array (FPGA).

Referring back to FIG. 9, after exiting the coding and interleaving module 900, the data sub-channel and the control sub-channel are separated, with the data sub-channel denoted by line 910, and the control sub-channel by line 920. Each sub-channel is then spreaded by a respective spreading code, $C_{ch,SF,m}$. The spreaded control sub-channel is then phase shifted by 90 degrees, as represented by the multiplication of the control sub-channel by j at the multiplier 930, to denote a complex number. At the summation 940, the two sub-channels 910 and 920 are combined as a stream of binary complex numbers representing the signal to be transmitted to a UE. The signal is subsequently scrambled by a downlink scrambling code, $S_{dl,n}$, via the multiplier 950. FIG. 14 shows the generator for the baseband in-phase (I) and quadrature (Q) channel scrambling codes in accordance to one embodiment of the present invention. The appropriate initial state of the shift registers is provided by the BS over the RDT trunk line. The codes are modulo-2 summed with the spread data. Each output bit of the spreader is alternately mapped to the I and Q channels by the appropriate code. The Q-channel scrambling code is then phased shifted by 90 degrees and summed with the I-channel scrambling code to generate the downlink scrambling code, $S_{dl,n}$. The output of the multiplier 950 is then multiplied by a power control gain G1, an amplitude factor, to generate a floating point amplitude for the downlink data signal to the UE. Summation 960 are then used to total the downlink data signals to the UEs from all dedicated physical channels 1 to N for subsequent conversion to RF signals via the RF circuitry shown to the right of the summation 960 in FIG. 9.

Figure 17:
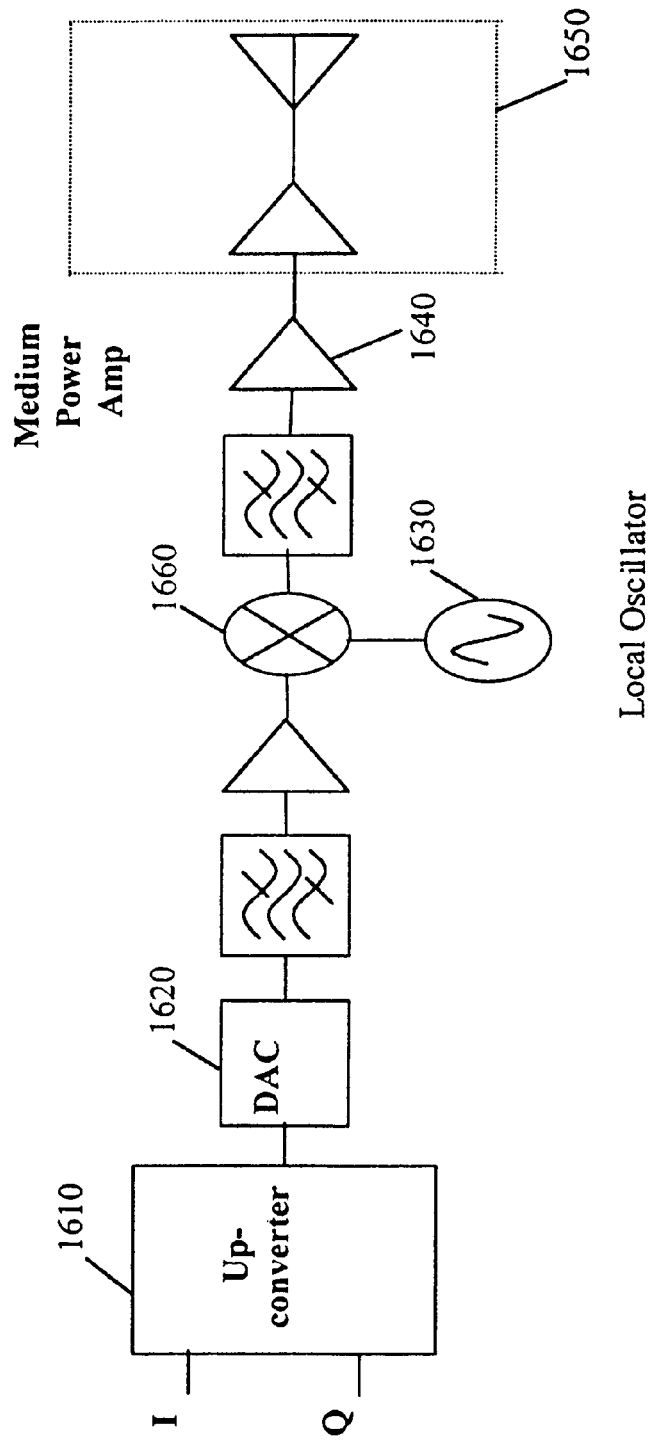
FIG. 17 shows the baseband and intermediate frequency (IF) processing scheme that may be employed at a RDT system in accordance to one embodiment of the present invention.

The RF circuitry of FIG. 9 may be alternately represented as an implementation of the baseband and intermediate frequency (IF) processing, as illustrated in FIG. 17. The figure shows the conversion of the digital, baseband representation of the I and Q channels, which represent the total outputs from the summation 960 of FIG. 9, to high power radio frequency (RF). As seen in FIG. 17, the baseband in-phase (I) and quadrature (Q) channels are fed into a digital up-converter 1610 (e.g., a Graychip GC4114 or an Analog Devices AD6622), where the data is filtered, interpolated and mixed with a numerically controlled oscillator (NCO) up to the IF frequency. Next, the digital IF data is fed to a fast digital-to-analog converter (DAC) 1620 (e.g., Analog Devices AD9772). The output of the DAC 1620 is then filtered and mixed with a local oscillator 1630 up to the operating band. The output of this mixer 1660 is amplified by a medium power amplifier 1640 and fed to an integrated power amplifier/antenna high power RF subsystem 1650.

Figure 18:
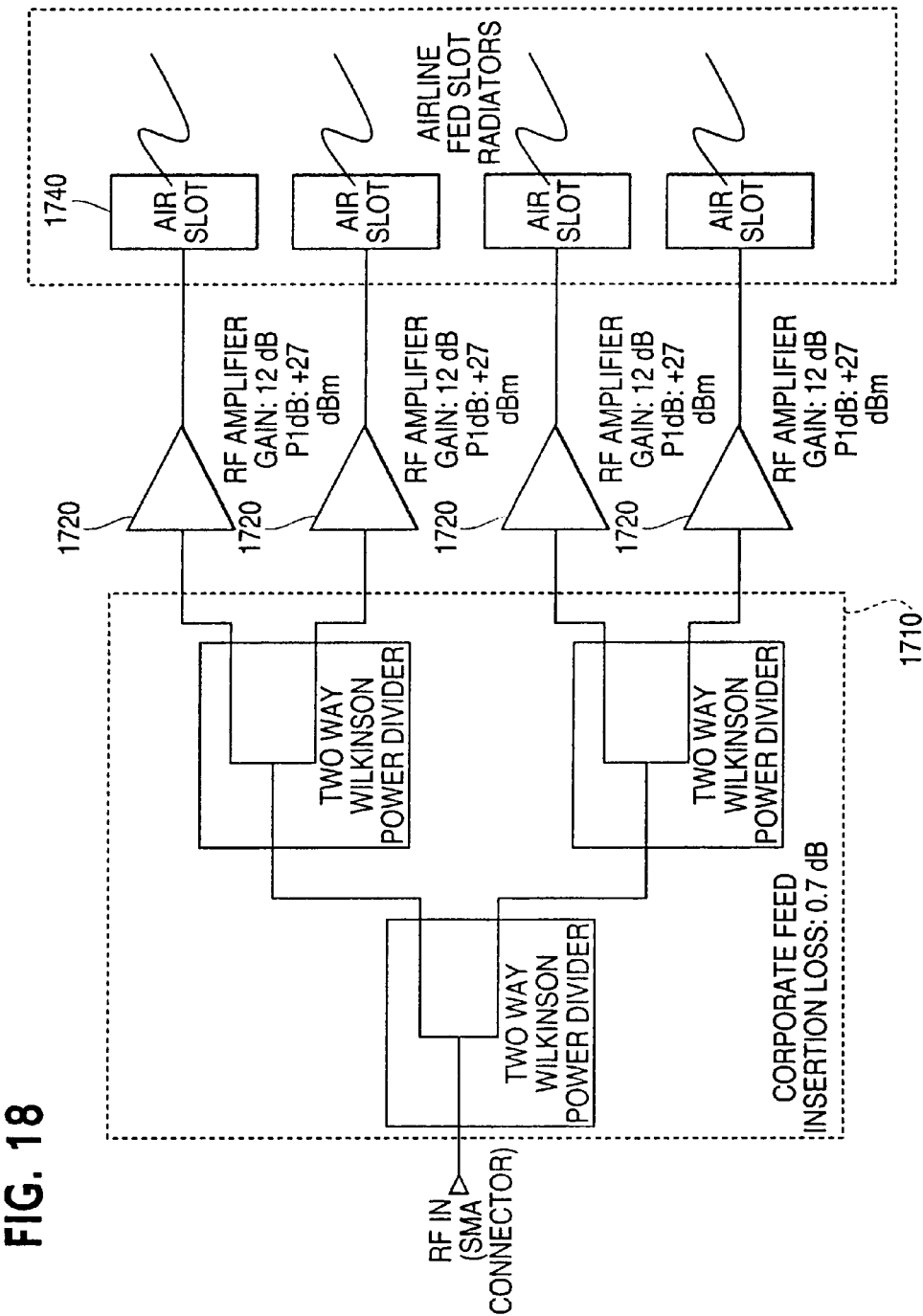
FIG. 18 shows an integrated power amplifier/antenna high power RF subsystem that may be employed in a RDT system in accordance to one embodiment of the present invention.

According to an embodiment of the present invention, one implementation of the integrated power amplifier/antenna high power RF subsystem 1650 in an RDT system is illustrated in FIG. 18, which shows the conversion of medium power RF signals to the high power W-CDMA RF waveforms for transmission to UEs. The antenna includes a 4-element array of slots, producing vertical polarization. The use of air-filled transmission lines improves efficiency and lowers manufacturing cost. This implementation includes an airline corporate feed structure 1710, integrated power amplifiers 1720, and airline fed slot radiating elements 1740 as integral components of a multi-layer board. An airline refers to a waveguide filled with air. A waveguide is constructed of conducting materials. Currents flow in the material generate electromagnetic waves that propagate in the air-filled portion of the waveguide cavity. Because the cavity is filled with air instead of a material (e.g., plastic) there are almost no energy losses to heating. An airline fed slot radiator refers to an opening in the conducting wall of the waveguide that allows the electromagnetic wave to exit or "escape" and radiate in a controlled manner.

Figure 19A:
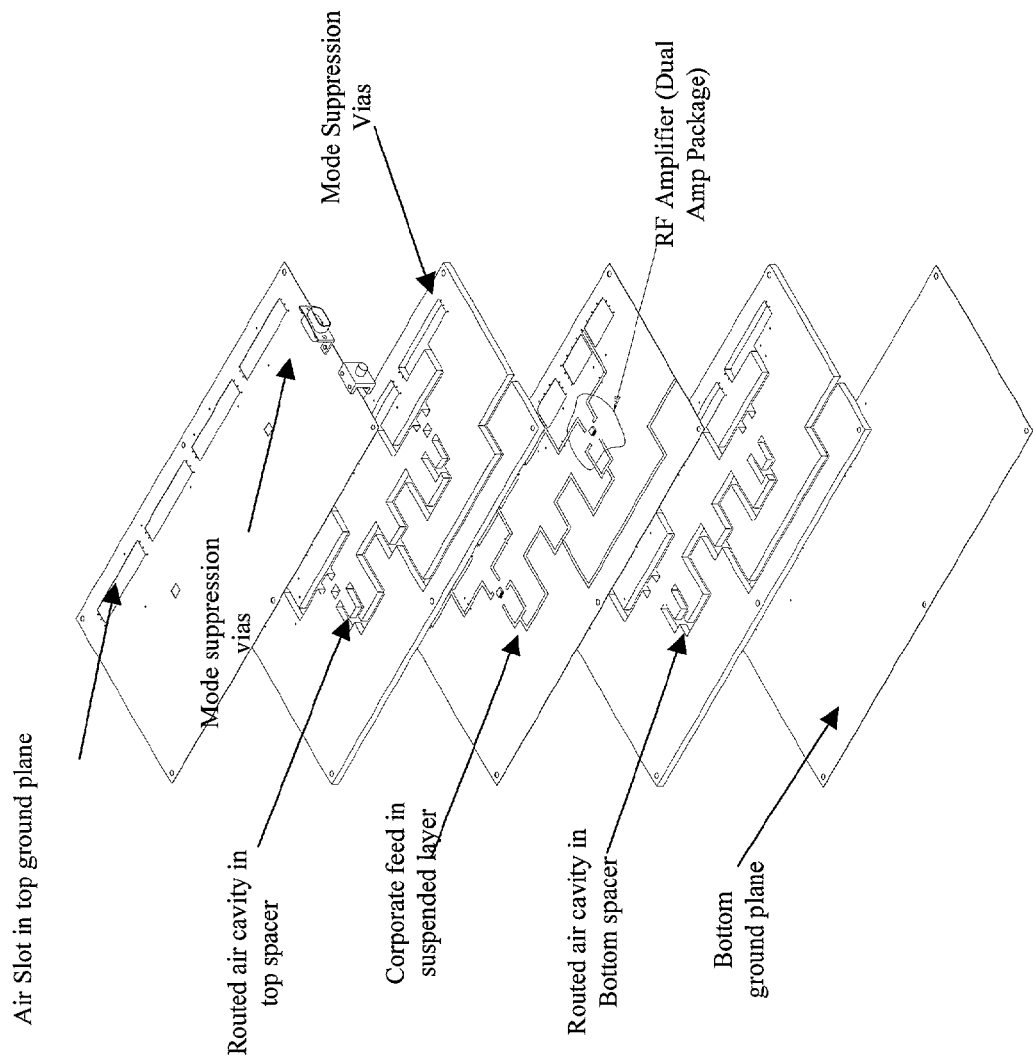
FIGS. 19A and 19B show the high power RF subsystem of FIG. 18 as a multi-layer printed wiring board stack up in accordance to one embodiment of the present invention.
Figure 19B:
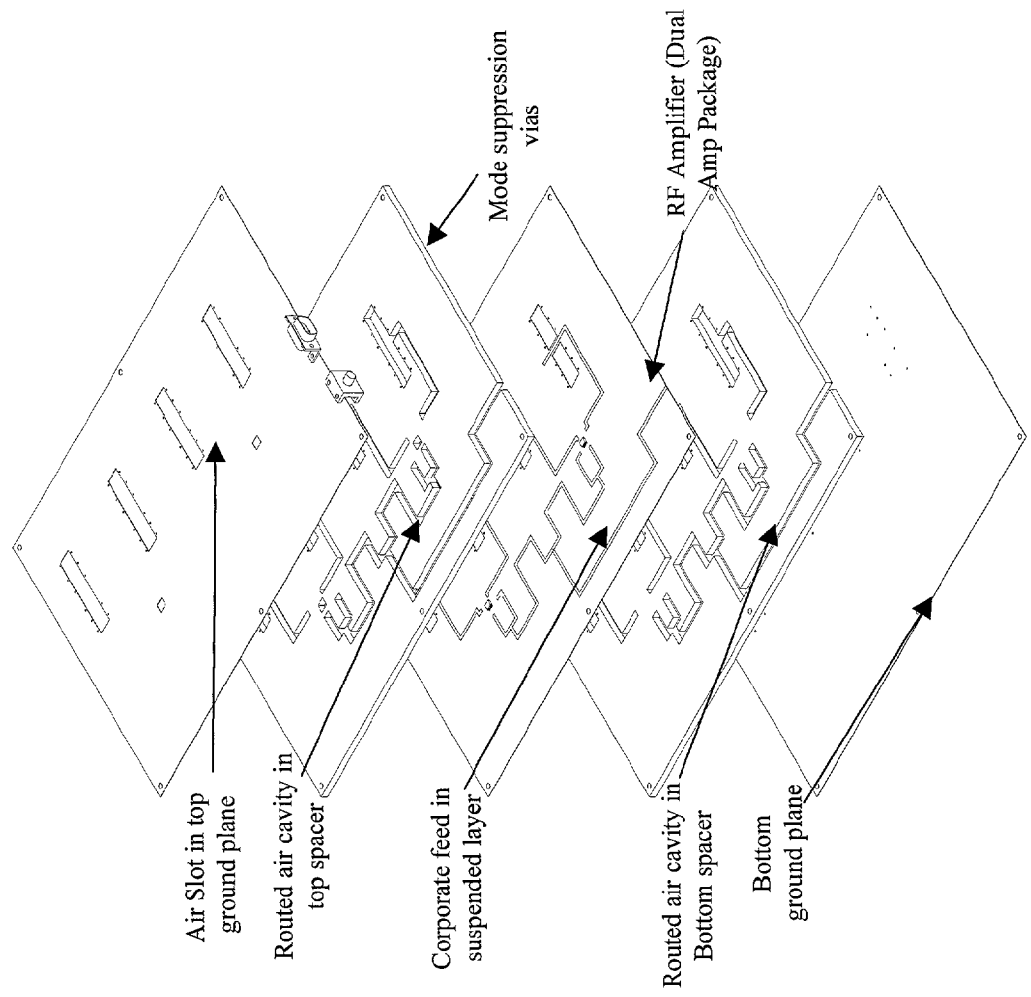

FIGS. 19A and 19B show the high power RF subsystem 1650 including the integrated power amplifier, transmission line, feed, and antenna element as a multi-layer printed wiring board (PWB) stack up, in accordance to various embodiments of the present invention. The coupling mechanism to the slot is an airline as well. The use of unloaded slot provides excellent low loss characteristics for this application. Furthermore, PWB board materials, such as FR4, are inexpensive and easily fabricated. The combination of a FPGA based digital processing architecture and the air-backed slot antenna design lead to an extremely robust and low cost design for the RDT system at the remote site and support the specific initial RDT physical design.

Figure 20:
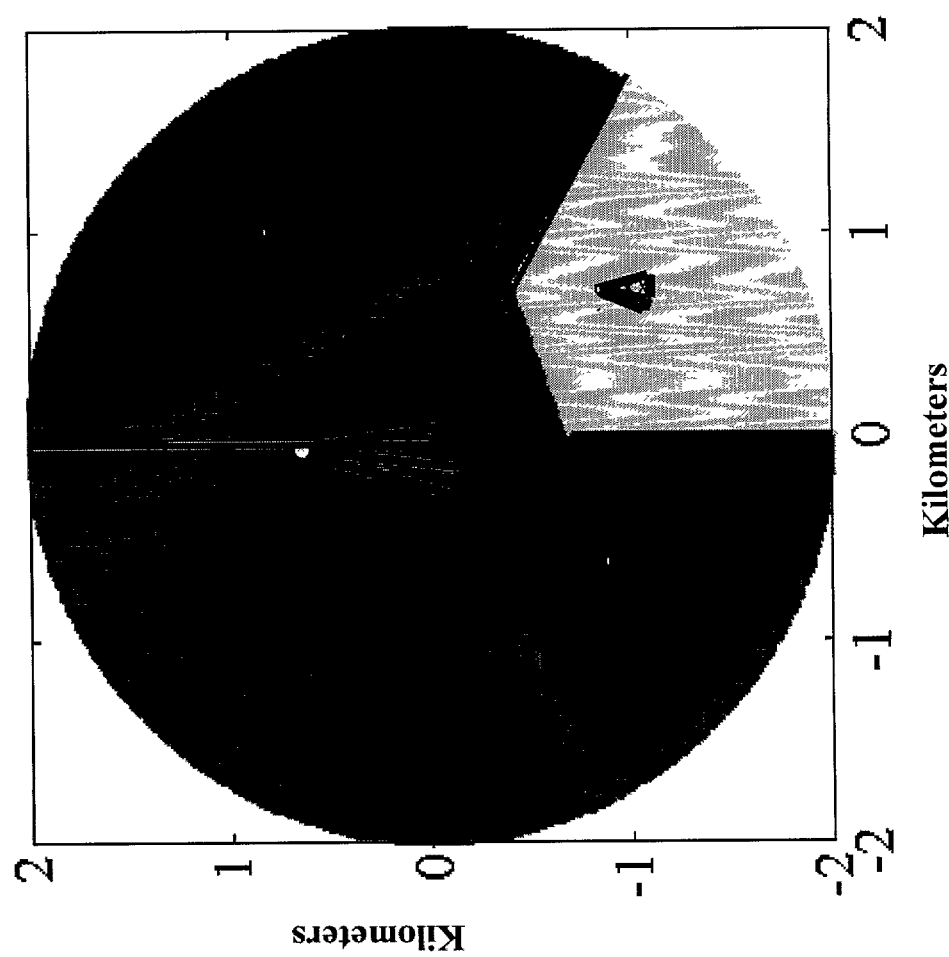
FIG. 20 shows a sample implementation of RDTs in physical sectors of a base station in accordance to one embodiment of the present invention.

In summary, the dual-scale, asymmetrical architecture for a spread-spectrum based wireless network of the present invention may be implemented through the inclusion of the FLM, Router, and RDT systems in original-equipment-manufacturer (OEM) or existing operator equipment. The architecture itself may be implemented via placement of 0, 1, or more RDT systems per BS sector in the existing macro-cellular environment. Optimal citing of the BS and the remote sites for RDT systems can be determined through the use of appropriate network modeling tools, such as the SAIC W-CDMA Network Model. A sample implementation with 0, 1, and 2 RDTs in each of three original BS sectors, respectively, is shown in FIG. 20. The sample RDT implementation is done in a W-CDMA, three-sector macro-cell with a 2 km circular coverage area. The shadings show the coverage area of the BS and the RDTs, assuming assignment is based on the closest downlink radio resource. This assignment assumes the RDTs offer 360-degree coverage. It is also assumed that the uplink resides in the sector containing the RDT although this is not required. As mentioned earlier, simulations have shown total network capacity to be relatively insensitive to disadvantaged citing of the RDT system. As such, RDT placement may be within 3 meters of urban rooftops or lower, e.g. on top of telephone poles.

With regard to the FLM, it may be implemented in Rational Rose Real Time modeling language. As one skilled in the art can realize from the present disclosure, alterations may be desired to tailor the FLM inputs and outputs to those available and expected by the targeted wireless network to which the dual-scale asymmetrical architecture of the present invention is augmented.

With regard to the Router, as mentioned earlier, it may be implemented using existing commercial-off-the-shelf (COTS) equipment IP routers for IP-based base stations. Alternatively, a particular design with the same functionality and capable of interfacing with the OEM BS may be desired.

Figure 21:
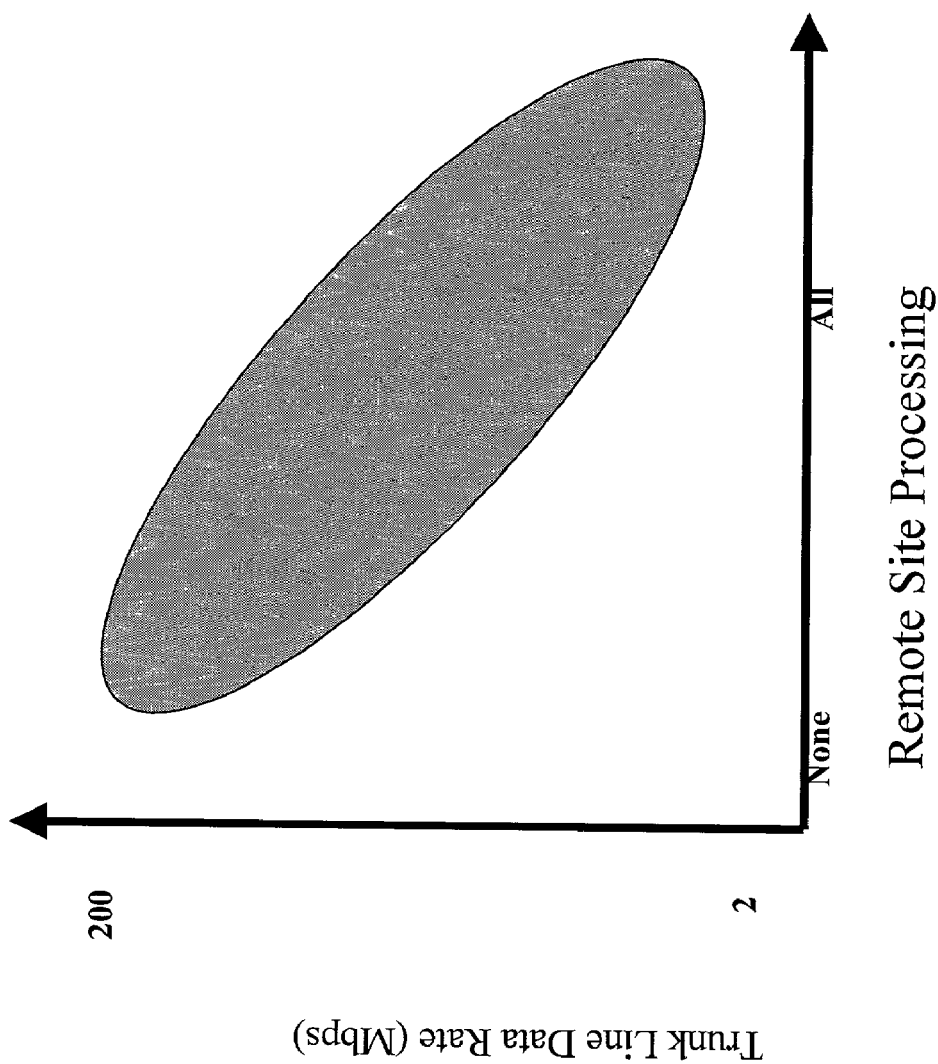
FIG. 21 shows a design space for design variants of a dual-scale wireless network architecture in accordance to one embodiment of the present invention.
Figure 22:
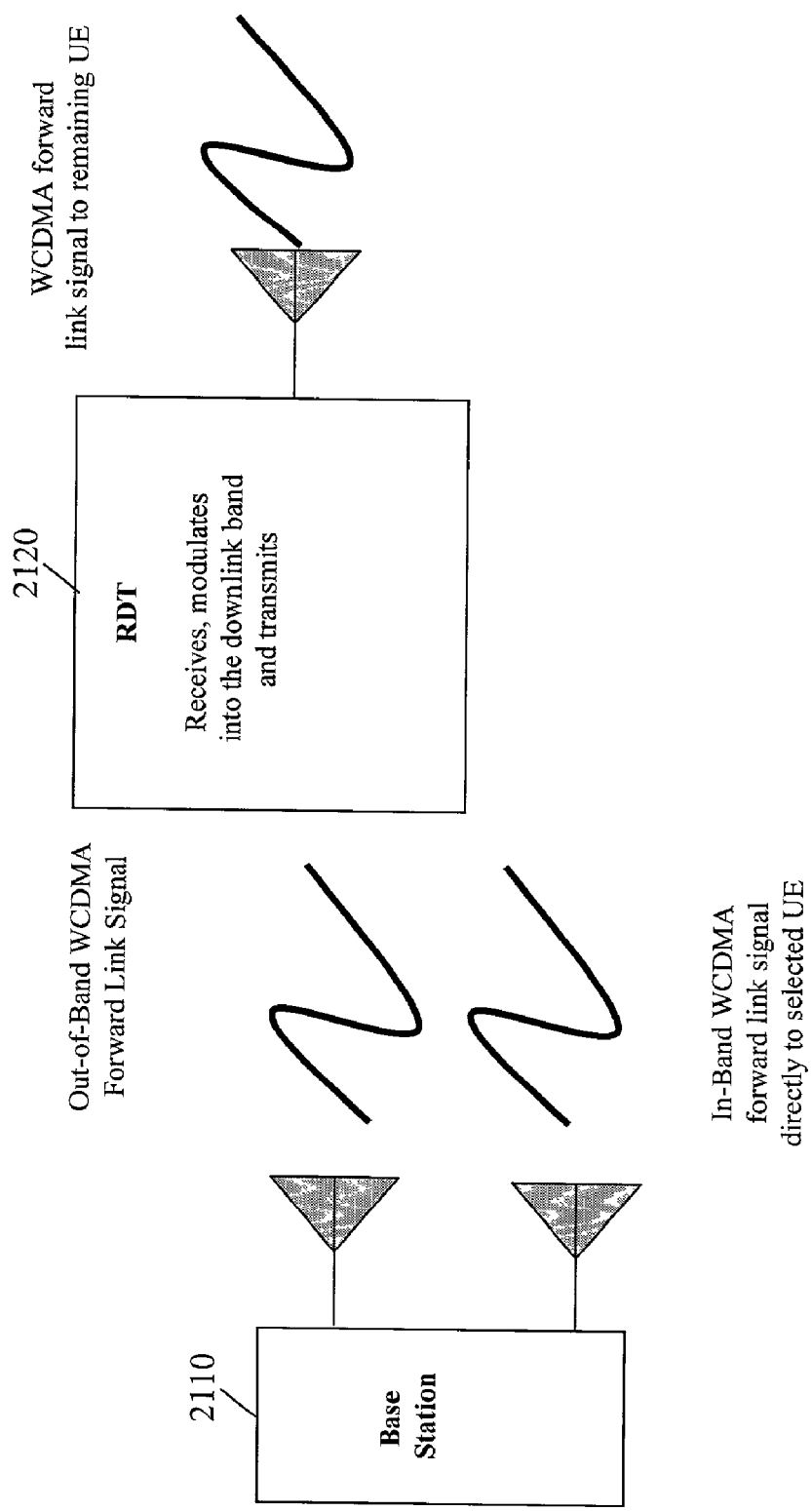
FIGS. 22–25 show various design variants of a dual-scale wireless network architecture that correspond to possible points in the design space shown in FIG. 21.
Figure 23:
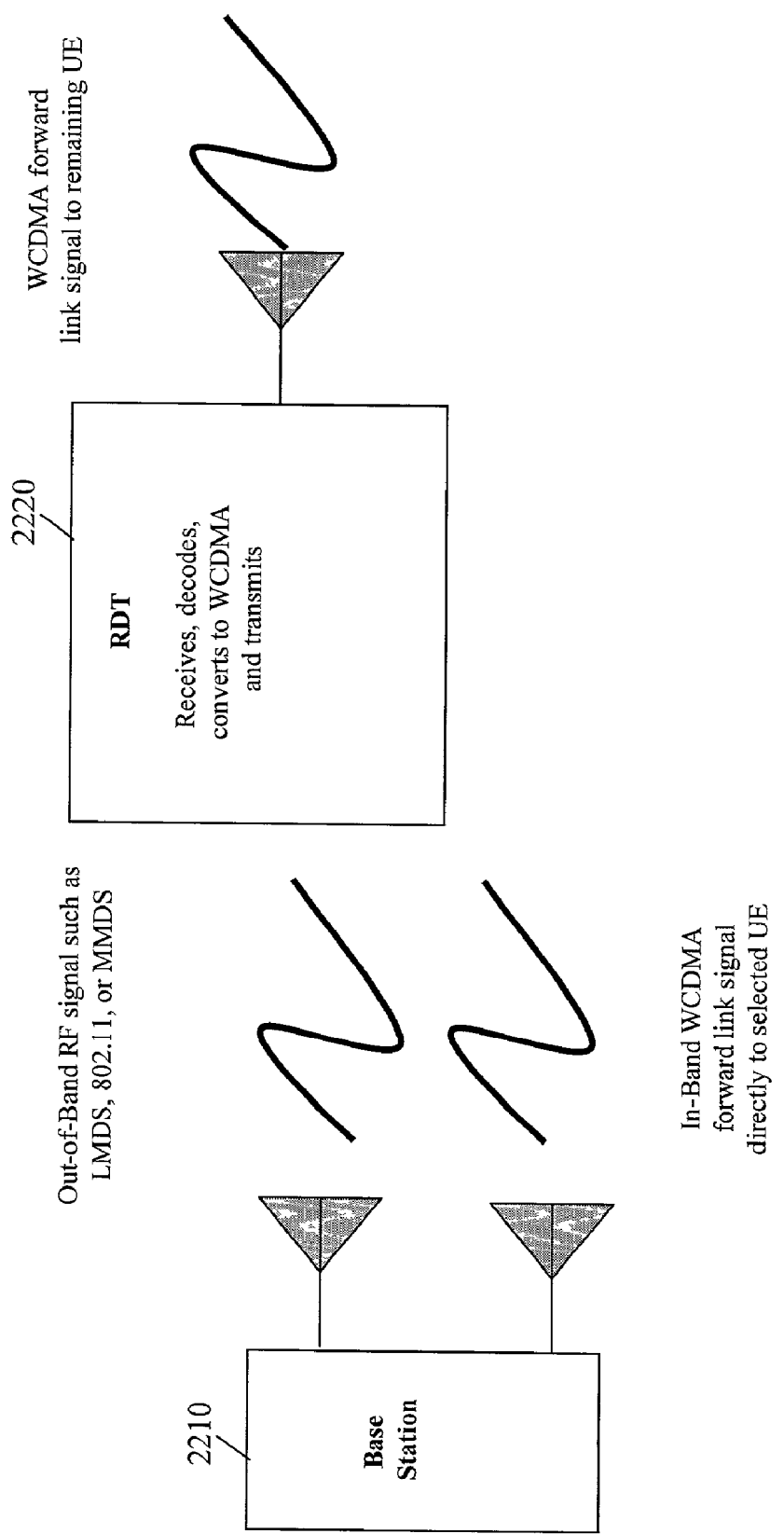
Figure 24:
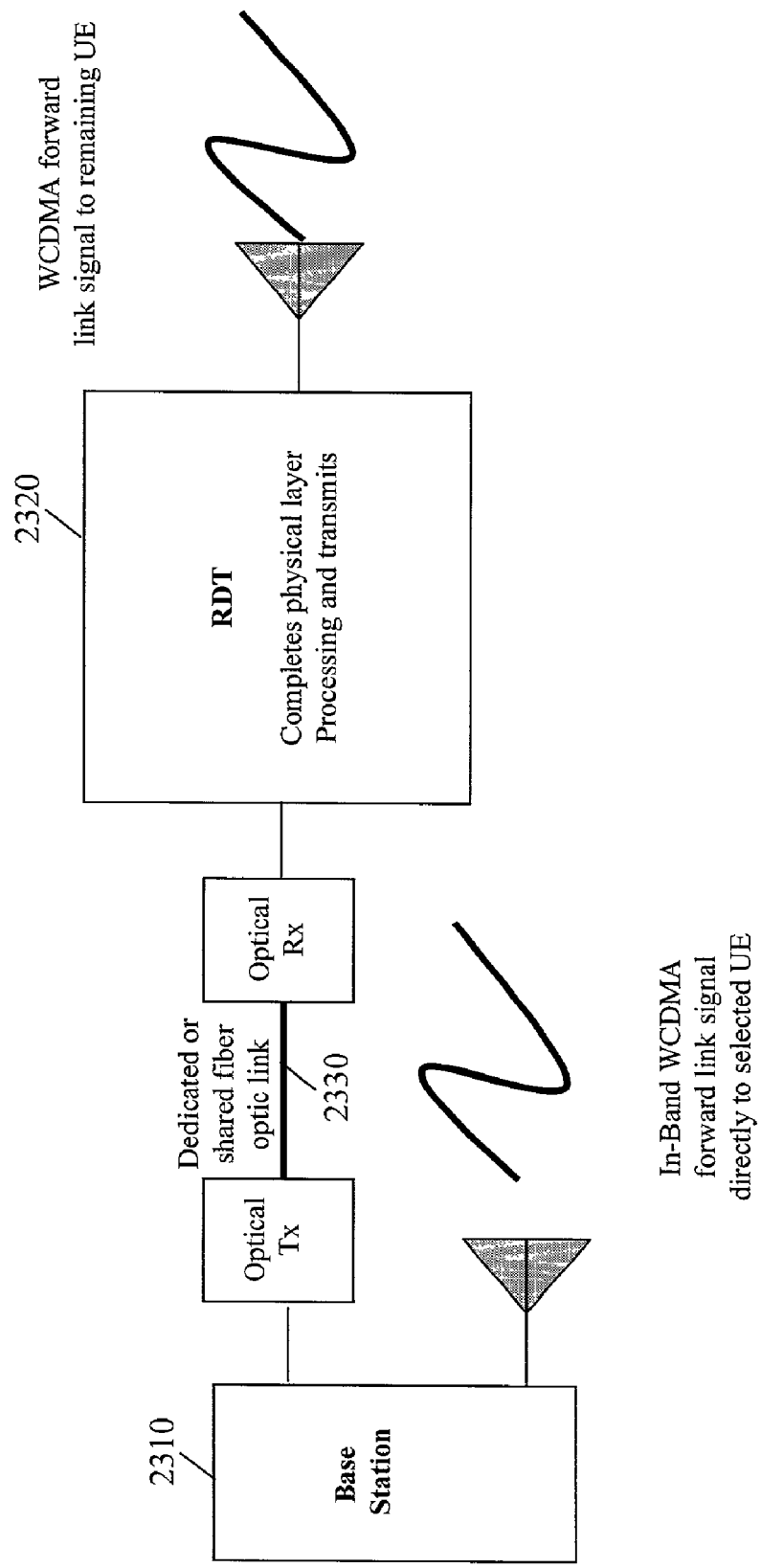
Figure 25:
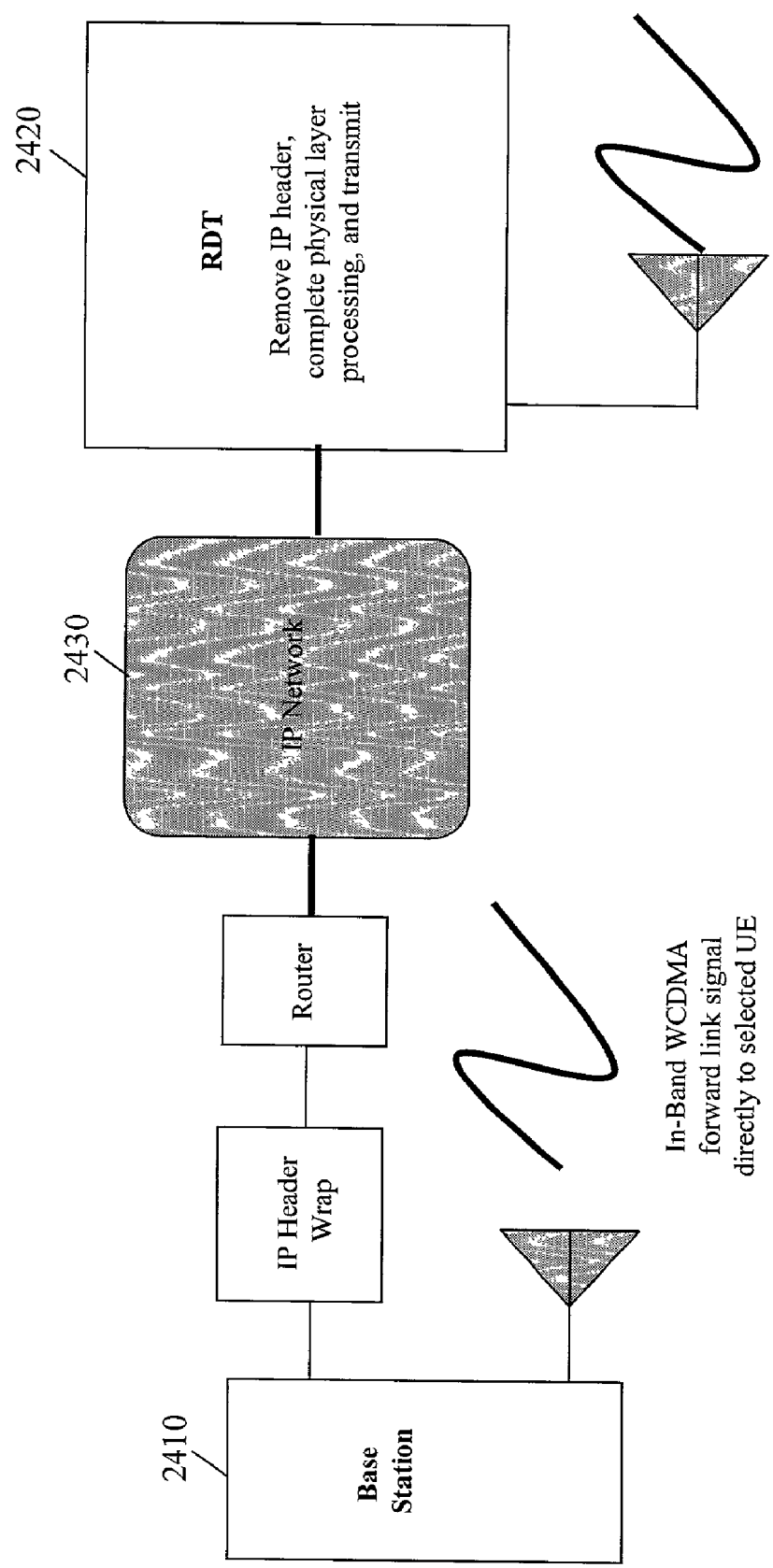

With regard to the RDT systems, they have been described in detail earlier. The principal design space governing other possible implementations includes a two-dimensional design with the communication trunk line characteristics serving as one parameter and the degree of physical layer processing occurring at the remote site as the other parameter. FIG. 21 shows this design space. As simplified in the figure, many of the various implementations of an RDT may be categorized as a point in the design space. The valid space ranges from execution of virtually all physical layer processing at the BS with a high bandwidth trunk line out to the remote site to execution of virtually all physical layer processing at the remote site with a low bandwidth trunk line, wherein the latter implementation may be most cost effective.

FIGS. 22–25 show possible points in the design space of FIG. 20. In the embodiment of an RDT implementation shown in FIG. 22, the complete downlink signal is generated by the BS 2110 and transmitted via an out-of-band frequency link to the RDT 2120 at the remote site. The RDT 2120 then modulates the received signal and transmits the modulated signal to the UE. Thus, the remote site only utilizes analog components, namely an oscillator, mixer, amplifier, filters, and antennas. In the embodiment of an RDT implementation shown in FIG. 23, the output signal of the BS scrambling module is transmitted via an out-of-band radio frequency link to an RDT 2220 at a remote site. The RDT 2220 then decodes the received signal, modulates the decoded signal into a W-CDMA signal, and transmits the modulated signal to the UE. Thus, the remote site does manipulate digital data but does not require any UE specific knowledge such as channelization or scrambling modes. In the embodiment of an RDT implementation shown in FIG. 24, the data flow at any point in the physical layer processing is carried via an available landline connection, such as an optical fiber transmission line 2330 from the BS 2310 to the RDT 2320. Any contiguous portion of the processing steps from the convolutional encoding to the scrambling may be performed at the BS 2310 with the remainder executed at the RDT 2320. In the embodiment of an RDT implementation shown in FIG. 25, the data flow at any point in the physical layer processing is carried via an available dedicated or shared IP network 2430. Any contiguous portion of the processing steps from the convolutional encoding to the scrambling may be performed at the BS 2410 with the remainder executed at the RDT 2420.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. Furthermore, any means-plus-function clauses in the claims (invoked only if expressly recited) are intended to cover the structures described herein as performing the recited function and all equivalents thereto, including, but not limited to, structural equivalents, equivalent structures, and other equivalents.

The invention claimed is:

1. A wireless cellular communication network for providing wireless communication to a plurality of user equipments (UEs) comprising:
   a plurality of network cells;
   a first remote emitter assigned to a first one of the plurality of network cells;
   a second remote emitter assigned to a second one of the plurality of network cells;
   a first base station assigned to the first network cell;
   a second base station assigned to the second network cell;
   the first base station is arranged to directly receive uplink communication signals from a first one of the plurality of UEs that is located in the first network cell, the first base station is further arranged to indirectly send downlink communication signals to the first UE via the first remote emitter; and
   the second base station is arranged to directly receive uplink communication signals from a second one of the plurality of UEs that is located in the second network cell, the first base station is further arranged to indirectly send downlink communication signals to the second UE via the second remote emitter.

2. The wireless cellular communication network of claim 1, further comprising a first managing tool assigned to the first network cell, wherein the managing tool dynamically and independently controls assignments of the uplink and downlink communication signals to the first base station and the first remote emitter.

3. The wireless cellular communication network of claim 2, wherein the first managing tool further controls an assignment of uplink communication signals as directly received by the second base station from a third one of the plurality of UEs that is located in the second network cell.

4. The wireless cellular communication network of claim 3, wherein the first managing tool is implemented at the first base station.

5. The wireless cellular communication network of claim 1, further comprising a downlink managing tool that determines availability of the first remote emitter for downlink registration or access of the first UE.

6. The wireless cellular communication network of claim 1, further comprising a managing tool that controls availability of the second base station to receiving uplink communication signals from the first UE.

7. The wireless cellular communication network of claim 5, wherein the downlink managing tool determines the availability of the first remote emitter for downlink registration or access of the first UE based at least on performance metrics of the first remote emitter.

8. The wireless cellular communication network of claim 5, further comprising a first communication link between the first base station and the first remote emitter, wherein the downlink managing tool determines the availability of the first remote emitter for downlink registration or access of the first UE located in the first network cell based at least on health metrics of the first communication link.

9. The wireless cellular communication network of claim 5, wherein the downlink managing tool determines the availability of the first remote emitter for downlink registration or access of the first UE located in the first network cell based at least on performance metrics of the first base station.

10. The wireless cellular communication network of claim 1, further comprising:
   a first communication link between the first base station and the first remote emitter; and
   a downlink managing tool that determines availability of the first remote emitter for downlink communication with the first UE based at least on a performance metric of the first remote emitter, a performance metric of the first base station, and a health metric of the first communication link.

11. A method for increasing user capacity and coverage area of a wireless communication network comprising:
   detecting first uplink communication signals directly from a first user of the network;
   assigning the first user to a first designated area of the network;
   directly receiving the first uplink communication signals from the first user to a base station;
   processing the first uplink communication signals at the base station;
   detecting second uplink communication signals directly from a second user of the network;
   assigning the second user to a second designated area of the network;
   directly receiving the second uplink communication signals from the second user to the base station;
   processing the second uplink communication signal at the base station;
   preparing downlink communication signals at the base station for transmission to the second user;
   assigning a remote emitter to the second designated area of the network or the base station;
   indirectly transmitting the downlink communication signals from the base station to the second user via the remote emitter.

12. The method of claim 11, further comprising:
   determining whether to use the base station or the remote emitter for transmission of the downlink communication signals to the second user based on predetermined criteria; and
   the indirectly transmitting the downlink communication signals comprises indirectly transmitting the downlink communication signals from the base station to the second user via the remote emitter based on the determining.

13. The method of claim 11, further comprising:
   providing a communication link between the base station and the remote emitter.

14. The method of claim 11, wherein the predetermined criteria comprise:
   predetermined loading conditions of the remote emitter and the base station.

15. The method of claim 13, wherein providing a communication link between the base station and the remote emitter comprises:
   routing signals between the base station and the remote emitter via an IP network.

16. The method of claim 11, wherein the downlink communication signal comprises a digital signal, and remote emitter comprises a digital-to-analog converter for converting the digital downlink communication signals into analog signals for transmission to the second user.

17. The method of claim 16, wherein the remote emitter further comprises an integrated power amplifier and high power RF antenna device for transmitting the analog downlink communication signals to the second user.

18. The method of claim 17, wherein the integrated power amplifier and high power RF antenna device is implemented as a multilayer printed wiring board package.

* * * * *

UNITED STATES PATENT AND TRADEMARK OFFICE
CERTIFICATE OF CORRECTION

| | | |
|---|---|---|
| PATENT NO. | : 7,016,332 B2 | Page 1 of 1 |
| APPLICATION NO. | : 09/773667 | |
| DATED | : March 21, 2006 | |
| INVENTOR(S) | : Daniel B. Kilfoyle | |

It is certified that error appears in the above-identified patent and that said Letters Patent is hereby corrected as shown below:

Title Page
IN THE REFERENCES CITED (56) -

Please add:

International Search Report for Application No. PCT/US01/45663, dated April 18, 2002 (mailing date).

"3G TR 25.942 V. 2.2.1 (1999-12) - 3$^{rd}$ Generation Partnership Project; Technical Specification Group (TSG) RAN WG4; RF System Scenarios," Copyright 1999, 97 pp.

"3G TR 25.924 V. 1.0.0 (1999-12) - 3$^{rd}$ Generation Partnership Project; Technical Specification Group Radio Access Network; Opportunity Driven Multiple Access (3g TR 25,924 version 1.0.0)," Copyright 1999, 13 pp.

Signed and Sealed this

Eighth Day of August, 2006

JON W. DUDAS
*Director of the United States Patent and Trademark Office*